US012677161B2

(12) United States Patent
Yoshida et al.

(10) Patent No.: US 12,677,161 B2
(45) Date of Patent: Jul. 7, 2026

(54) COMMUNICATION CONTROL APPARATUS, COMMUNICATION TERMINAL, COMMUNICATION SYSTEM, COMMUNICATION CONTROL METHOD, AND NON-TRANSITORY COMPUTER-READABLE STORAGE MEDIUM

(71) Applicant: NEC Corporation, Tokyo (JP)

(72) Inventors: Kohei Yoshida, Tokyo (JP); Masakazu Ono, Tokyo (JP); Junichi Funada, Tokyo (JP); Kenji Wakafuji, Tokyo (JP); Shingo Watanabe, Tokyo (JP); Kazushi Sugyo, Tokyo (JP); Kazuyuki Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 295 days.

(21) Appl. No.: 18/544,941

(22) Filed: Dec. 19, 2023

(65) Prior Publication Data

US 2024/0214831 A1     Jun. 27, 2024

(30) Foreign Application Priority Data

Dec. 26, 2022     (JP) ................................. 2022-208435

(51) Int. Cl.
*H04W 16/28*          (2009.01)
*H04W 64/00*          (2009.01)

(52) U.S. Cl.
CPC ........... *H04W 16/28* (2013.01); *H04W 64/00* (2013.01)

(58) Field of Classification Search
CPC .............................. H04W 16/28; H04W 64/00
See application file for complete search history.

(56) References Cited

U.S. PATENT DOCUMENTS

2021/0336683 A1* 10/2021 Pezeshki .............. H04B 7/0647
2022/0330102 A1* 10/2022 Berliner ................ H04W 16/28

FOREIGN PATENT DOCUMENTS

| JP | 2010-288104 A | 12/2010 |
| JP | 2015-165692 A | 9/2015 |
| JP | 2015-173416 A | 10/2015 |
| WO | 2022/201770 A1 | 9/2022 |
| WO | 2022/224655 A1 | 10/2022 |

* cited by examiner

*Primary Examiner* — Ayodeji O Ayotunde
(74) *Attorney, Agent, or Firm* — Sughrue Mion, PLLC

(57) ABSTRACT

A communication control apparatus which controls communication between a plurality of communication terminals each located in any one of a plurality of areas and a plurality of base station includes at least one processor, the at least one processor carrying out a control process in which a directivity direction of each of antennas of the plurality of communication terminals is determined, on the basis of: terminal location prediction information in which locations of the plurality of communication terminals are predicted; and an electric wave environment database in which the plurality of base stations, beam directions of respective electric waves from the base stations, the plurality of areas, and reception powers of the respective electric waves in the plurality of areas are associated with each other.

13 Claims, 12 Drawing Sheets

FIG. 1

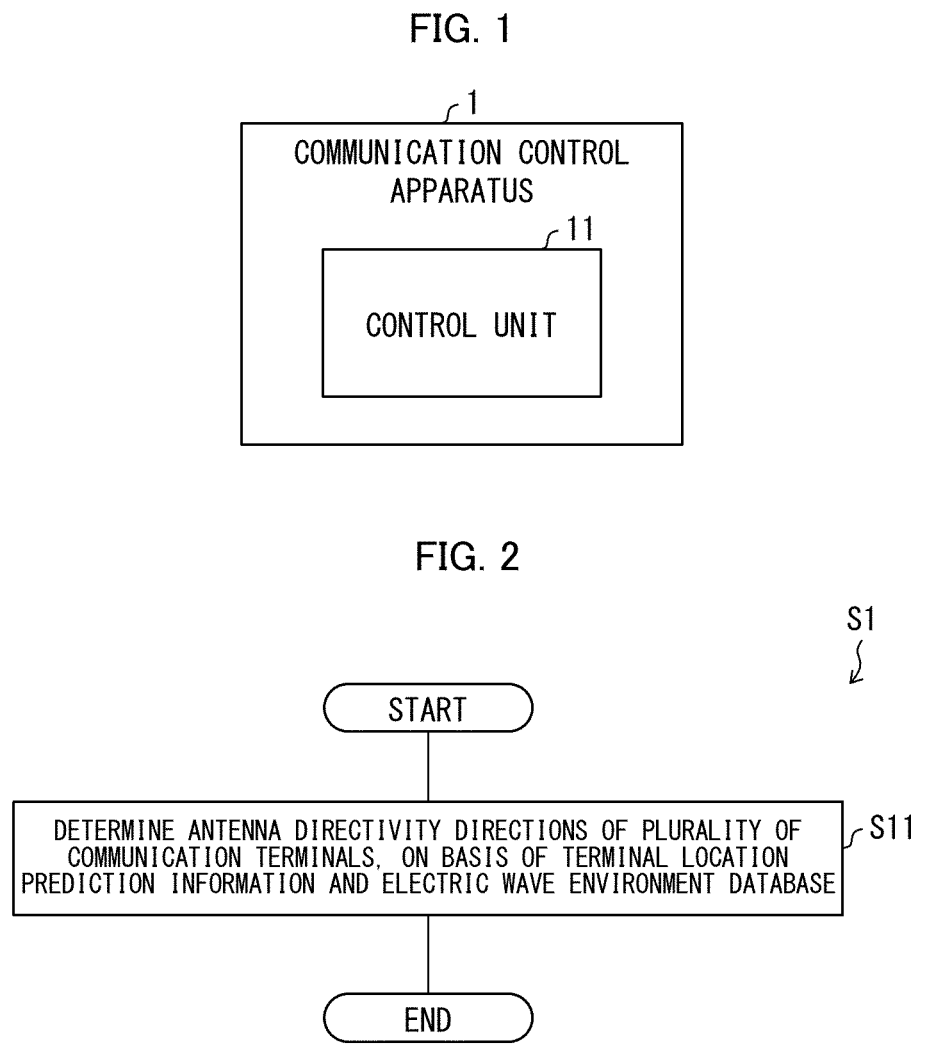

```
                               ┌ 1
        ┌──────────────────────────────────┐
        │    COMMUNICATION CONTROL         │
        │         APPARATUS                │
        │                        ┌ 11      │
        │    ┌─────────────────────────┐   │
        │    │                         │   │
        │    │      CONTROL UNIT       │   │
        │    │                         │   │
        │    └─────────────────────────┘   │
        │                                  │
        └──────────────────────────────────┘
```

```
              ┌─────────────┐
              │    START    │
              └─────────────┘
                     │
┌───────────────────────────────────────────────────┐
│   DETERMINE ANTENNA DIRECTIVITY DIRECTIONS OF PLURALITY OF    │  S11
│     COMMUNICATION TERMINALS, ON BASIS OF TERMINAL LOCATION    │
│  PREDICTION INFORMATION AND ELECTRIC WAVE ENVIRONMENT DATABASE│
└───────────────────────────────────────────────────┘
                     │
              ┌─────────────┐
              │     END     │
              └─────────────┘
```

FIG. 5
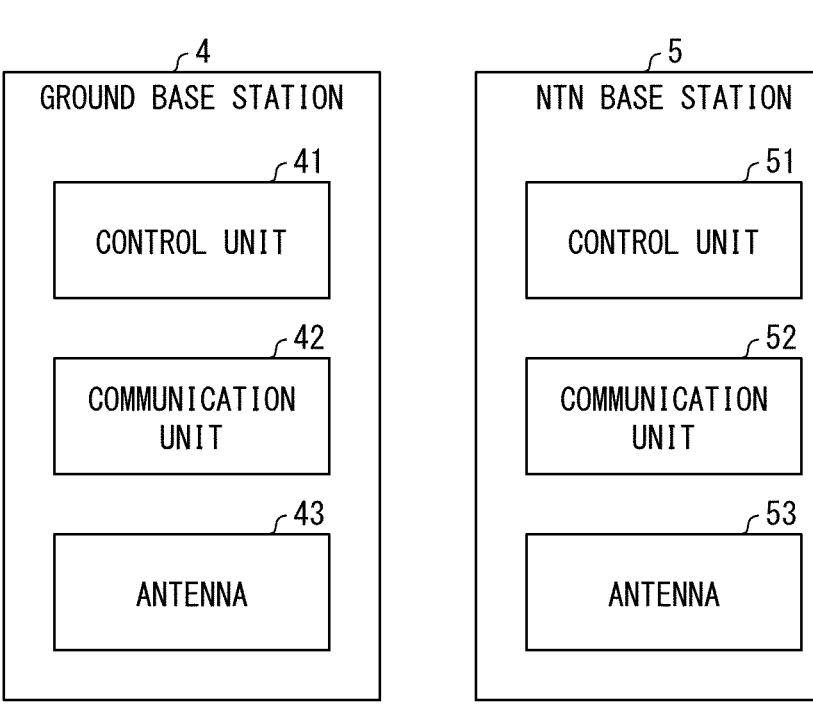
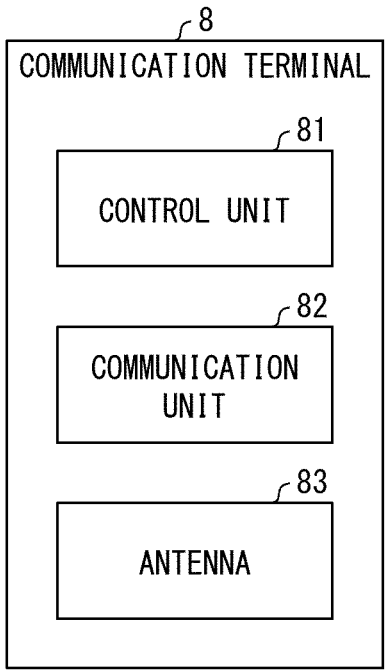

FIG. 6

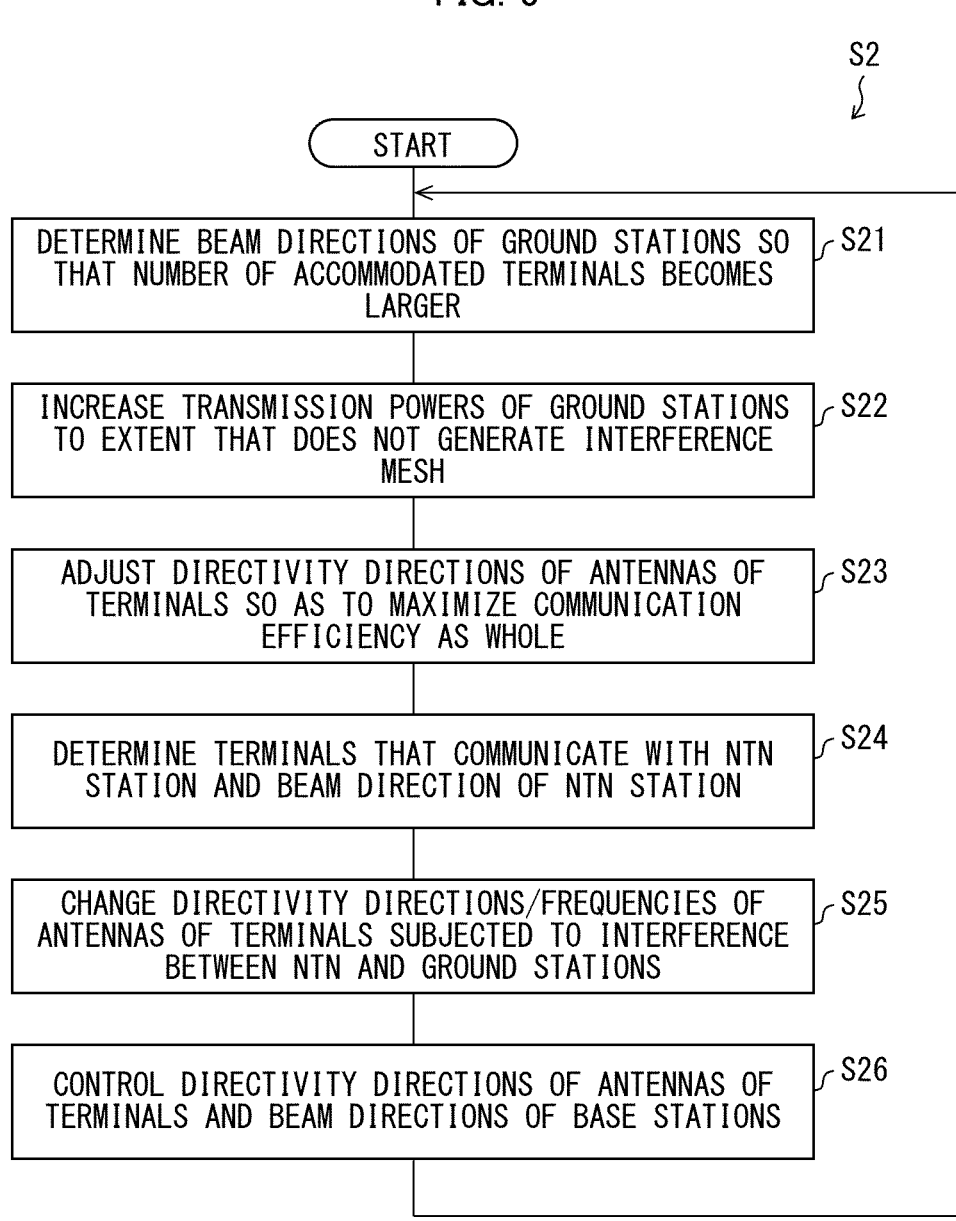

S2

START

DETERMINE BEAM DIRECTIONS OF GROUND STATIONS SO THAT NUMBER OF ACCOMMODATED TERMINALS BECOMES LARGER ⌐ S21

INCREASE TRANSMISSION POWERS OF GROUND STATIONS TO EXTENT THAT DOES NOT GENERATE INTERFERENCE MESH ⌐ S22

ADJUST DIRECTIVITY DIRECTIONS OF ANTENNAS OF TERMINALS SO AS TO MAXIMIZE COMMUNICATION EFFICIENCY AS WHOLE ⌐ S23

DETERMINE TERMINALS THAT COMMUNICATE WITH NTN STATION AND BEAM DIRECTION OF NTN STATION ⌐ S24

CHANGE DIRECTIVITY DIRECTIONS/FREQUENCIES OF ANTENNAS OF TERMINALS SUBJECTED TO INTERFERENCE BETWEEN NTN AND GROUND STATIONS ⌐ S25

CONTROL DIRECTIVITY DIRECTIONS OF ANTENNAS OF TERMINALS AND BEAM DIRECTIONS OF BASE STATIONS ⌐ S26

Figure 7:
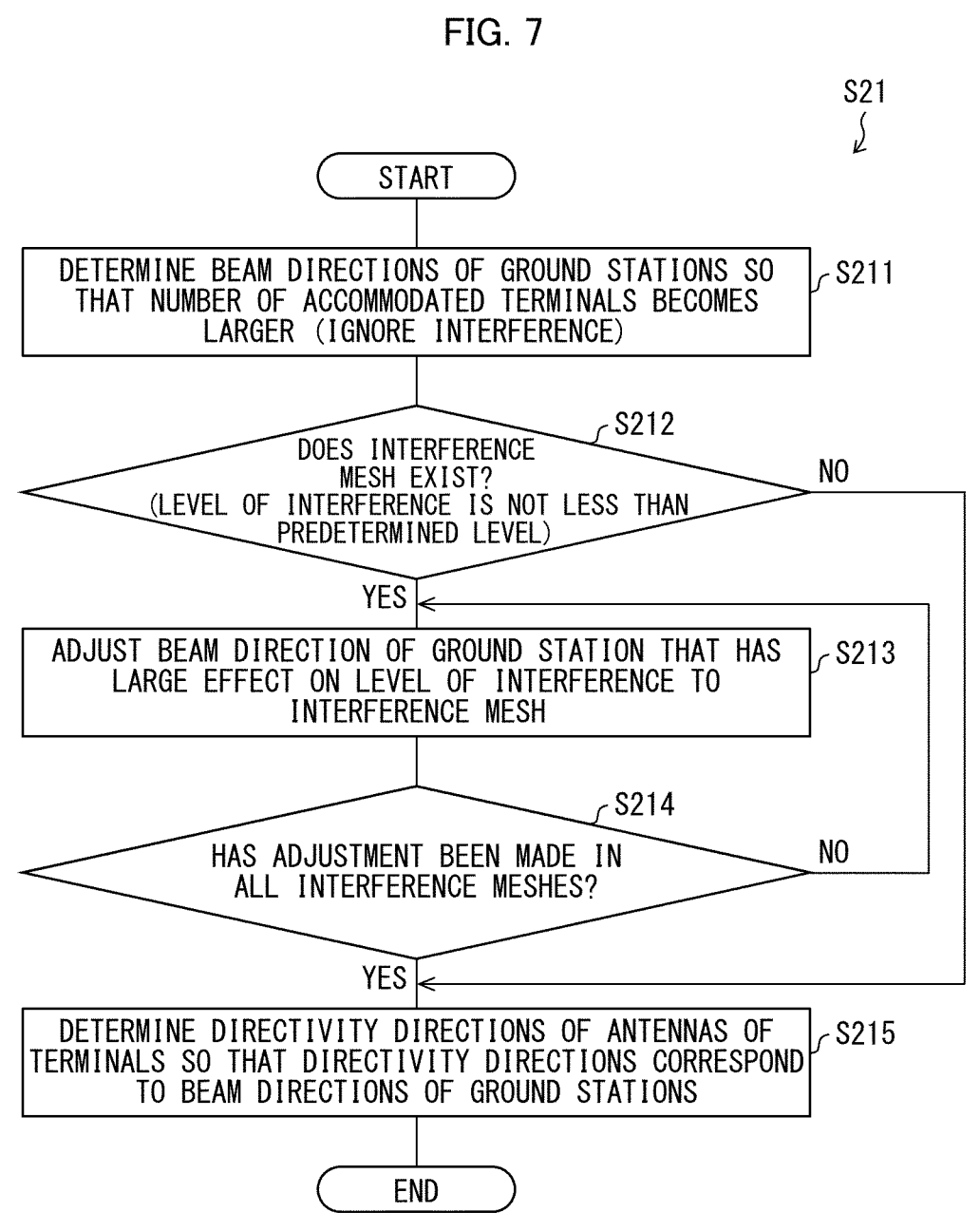

```
┌──────────────┐
│    START     │
└──────────────┘
```

DETERMINE BEAM DIRECTIONS OF GROUND STATIONS SO
THAT NUMBER OF ACCOMMODATED TERMINALS BECOMES
LARGER (IGNORE INTERFERENCE)                    ⌐S211

DOES INTERFERENCE
MESH EXIST?                                      ⌐S212
(LEVEL OF INTERFERENCE IS NOT LESS THAN
PREDETERMINED LEVEL)                             NO

YES

ADJUST BEAM DIRECTION OF GROUND STATION THAT HAS
LARGE EFFECT ON LEVEL OF INTERFERENCE TO         ⌐S213
INTERFERENCE MESH

HAS ADJUSTMENT BEEN MADE IN                       ⌐S214
ALL INTERFERENCE MESHES?                          NO

YES

DETERMINE DIRECTIVITY DIRECTIONS OF ANTENNAS OF   ⌐S215
TERMINALS SO THAT DIRECTIVITY DIRECTIONS CORRESPOND
TO BEAM DIRECTIONS OF GROUND STATIONS

```
┌──────────────┐
│     END      │
└──────────────┘
```

COMMUNICATION CONTROL APPARATUS, COMMUNICATION TERMINAL, COMMUNICATION SYSTEM, COMMUNICATION CONTROL METHOD, AND NON-TRANSITORY COMPUTER-READABLE STORAGE MEDIUM

This Nonprovisional application claims priority under 35 U.S.C. § 119 on Patent Application No. 2022-208435 filed in Japan on Dec. 26, 2022, the entire contents of which are hereby incorporated by reference.

TECHNICAL FIELD

The present invention relates to a communication control apparatus, a communication terminal, a communication system, a communication control method, and a non-transitory computer-readable storage medium.

BACKGROUND ART

In a mobile communication system, in order to increase the speed of wireless communication, it has been studied to use an electric wave in a high frequency band (e.g., milli-meter wave). Here, the electric wave in a high frequency band has a high rectilinear propagation property and a large attenuation. Therefore, a range (cell radius) in which a base station can communicate becomes smaller, and it is neces-sary to effectively use cells of a plurality of base stations. Patent Literature 1 discloses a technique of a relay apparatus that relays between a terminal apparatus and a base station.

CITATION LIST

Patent Literature

[Patent Literature 1]
PCT International Publication No. 2022/224655

SUMMARY OF INVENTION

Technical Problem

Patent Literature 1, however, does not disclose an idea of efficiently using a plurality of base stations in direct com-munication between a communication terminal and a base station. Furthermore, Patent Literature 1 does not disclose an idea of controlling a directivity direction of an antenna of a communication terminal in order to efficiently use a plurality of base stations.

An example aspect of the present invention has been made in view of the above problems, and an example object thereof is to provide a technique for controlling a directivity direction of an antenna of a communication terminal in order to efficiently use a plurality of base stations.

Solution to Problem

A communication control apparatus according to an example aspect of the present invention is a communication control apparatus which controls communication between a plurality of communication terminals each located in any one of a plurality of areas and a plurality of base station, the communication control apparatus including at least one processor, the at least one processor carrying out a control process in which a directivity direction of each of antennas of the plurality of communication terminals is determined, on the basis of: terminal location prediction information in which locations of the plurality of communication terminals are predicted; and an electric wave environment database in which the plurality of base stations, beam directions of respective electric waves from the base stations, the plurality of areas, and reception powers of the respective electric waves in the plurality of areas are associated with each other.

A communication method according to an example aspect of the present invention is a communication control method which is carried out by a communication control apparatus for controlling communication between a plurality of com-munication terminals each located in any one of a plurality of areas and a plurality of base station, the communication control apparatus including at least one processor, the at least one processor carrying out a control process in which a directivity direction of each of antennas of the plurality of communication terminals is determined, on the basis of: terminal location prediction information in which locations of the plurality of communication terminals are predicted; and an electric wave environment database in which the plurality of base stations, beam directions of respective electric waves transmitted from the base stations, the plu-rality of areas, and reception powers of the respective electric waves in the plurality of areas are associated with each other.

A non-transitory computer-readable storage medium according to an example aspect of the present invention is a non-transitory computer-readable storage medium storing a program for causing one or more computers to control communication between a plurality of communication ter-minals each located in any one of a plurality of areas and a plurality of base station, the program causing the one or more computers to determine a directivity direction of each of antennas of the plurality of communication terminals, on the basis of: terminal location prediction information in which locations of the plurality of communication terminals are predicted; and an electric wave environment database in which the plurality of base stations, beam directions of respective electric waves transmitted from the base stations, the plurality of areas, and reception powers of the respective electric waves in the plurality of areas are associated with each other.

Advantageous Effects of Invention

An example aspect of the present invention determines directivity directions of antennas of a plurality of commu-nication terminals on the basis of terminal location predic-tion information and electric wave environment database, so that a plurality of base stations can be efficiently used.

BRIEF DESCRIPTION OF DRAWINGS

FIG. 1 is a block diagram illustrating a configuration of a communication control apparatus according to a first example embodiment of the present invention.

FIG. 2 is a flowchart showing a flow of a communication control method according to the first example embodiment of the present invention.

FIG. 5 is a block diagram illustrating an arrangement of ground base stations, NTN base stations and communication terminals according to the second example embodiment of the present invention.

FIG. 6 is a flowchart showing a flow of a communication control method according to the second example embodiment of the present invention.

FIG. 7 is a chart illustrating an example of a part of a flow of the communication control method according to the second example embodiment of the present invention.

DESCRIPTION OF EMBODIMENTS

First Example Embodiment

Figure 3:
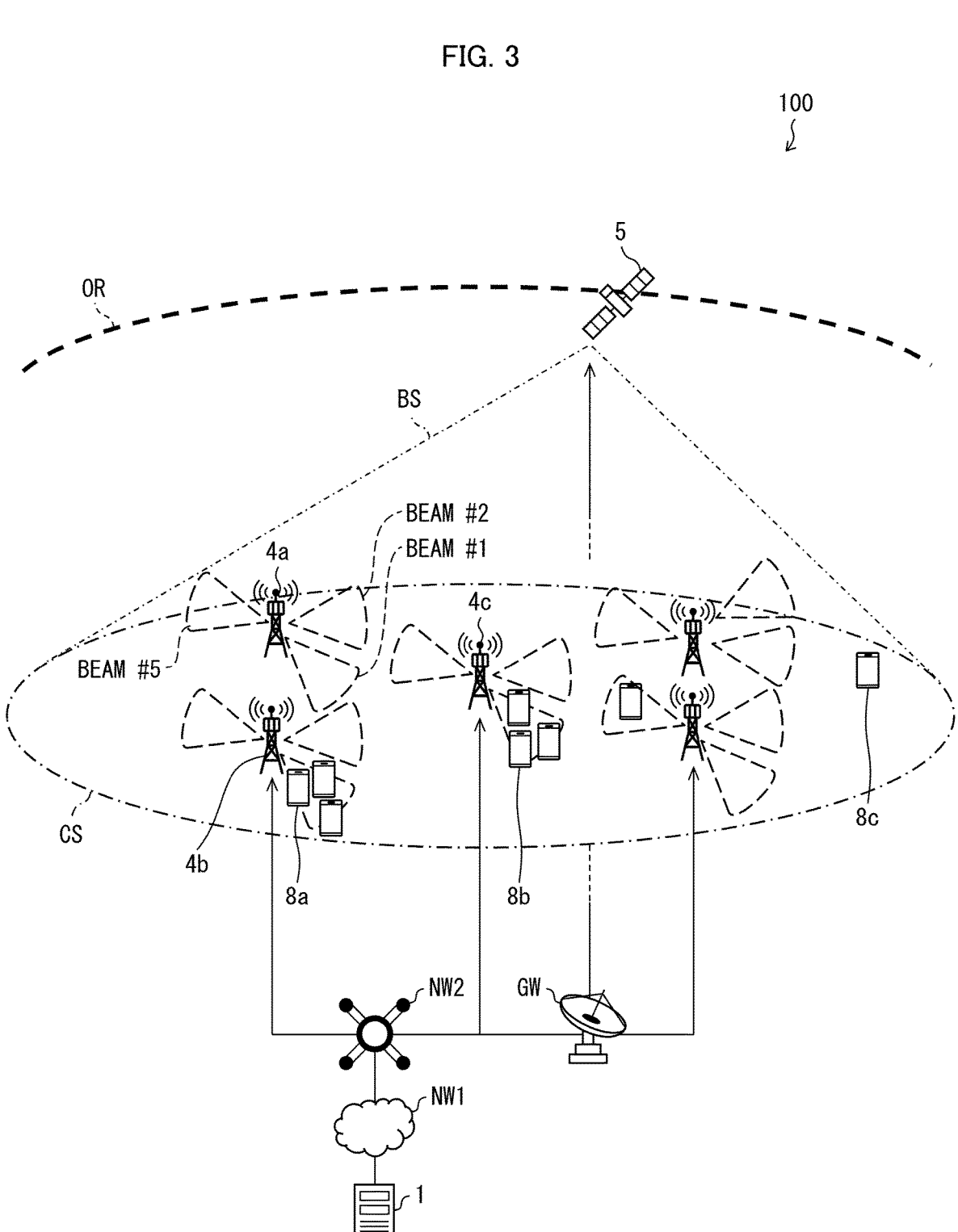
FIG. 3 is a diagram schematically illustrating a configu-ration of a communication system according to a second example embodiment of the present invention.

A first example embodiment of the present invention will be described in detail with reference to the drawings. The present example embodiment is an embodiment serving as a basis for example embodiments described later.
(Configuration of Communication Control Apparatus 1)

A configuration of a communication control apparatus 1 according to the present example embodiment will be described with reference to FIG. 1. FIG. 1 is a block diagram illustrating a configuration of the communication control apparatus 1 according to the present example embodiment.

The communication control apparatus 1 according to the present example embodiment controls communication between a plurality of communication terminals each of which is located in one of a plurality of areas and a plurality of base stations, and includes a control unit 11 as illustrated in FIG. 1. The control unit 11 determines directivity directions of antennas of the plurality of communication terminals, on the basis of terminal location prediction information and electric wave environment database.

The terminal location prediction information is information in which a location of each of the plurality of communication terminals is predicted. The electric wave environment database is a database in which the following are associated with each other: the plurality of base stations; beam directions of respective electric waves from the base stations; the plurality of areas; and reception powers of the respective electric waves in the plurality of areas.

As described above, the communication control apparatus 1 according to the present example embodiment controls communication between the plurality of base stations and the plurality of communication terminals, by determining the directivity directions of the antennas of the plurality of communication terminals on the basis of the terminal location prediction information and the electric wave environment database. The control unit 11 can determines the directivity directions of the antennas of the plurality of communication terminals, for example, on the basis of the following criteria (1) to (3). Determination on the basis of the following criteria makes it possible to efficiently use the plurality of base stations.

(1) Select a direction in which in a case where the directivity direction of an antenna of a communication terminal is set to the direction, a reception power from a base station that is a connection destination becomes stronger. It is possible to estimate, on the basis of the terminal location prediction information and the electric wave environment database, the reception power from the base station (that is a connection destination) in a case where the directivity direction of the antenna of the communication terminal is set to a certain direction.

(2) Select a direction in which in a case where the directivity direction of an antenna of a communication terminal is set to the direction, a level of interference (e.g., SINR) becomes lower. It is possible to estimate, on the basis of the terminal location prediction information and the electric wave environment database, the level of interference in a case where the directivity direction of the antenna of the communication terminal is set to a certain direction.

(3) Select a direction in which in a case where the directivity direction of an antenna of a communication terminal is set to the direction, the number of accommodated terminals of a base station that is a connection destination (the number of communication terminals each of which receives an electric wave from the base station) is smaller. It is possible to estimate, on the basis of the terminal location prediction information and the electric wave environment database, the number of the accommodated terminals of the base station that is a connection destination in a case where the directivity direction of the antenna of the communication terminal is set to a certain direction.

(Flow of Communication Control Method S1)

The following will discuss a flow of a communication control method S1 in accordance with the present example embodiment, with reference to FIG. 2. FIG. 2 is a flowchart showing the flow of the communication control method S1 according to the present example embodiment.

The control unit 11 determines the directivity directions of the antennas of the plurality of communication terminals, on the basis of the terminal location prediction information and the electric wave environment database (step S11).

As described above, the communication control method S1 according to the present example embodiment is communication control method for controlling communication between the plurality of base stations and the plurality of communication terminals. According to this method, the directivity directions of antennas of the plurality of communication terminals can be determined on the basis of the terminal location prediction information and the electric wave environment database. Therefore, the communication control method S1 according to the present example embodiment can bring about the same example advantage as the above-described communication control apparatus 1.

Second Example Embodiment

The following description will discuss a second example embodiment of the present invention, with reference to the drawings. Note that members having functions identical to those of the respective members described in the first example embodiment are given respective identical reference numerals, and descriptions of those members will be omitted as appropriate.

(Overview and Configuration of Communication System 100)

An overview and a configuration of a communication system 100 according to the present example embodiment will be described with reference to FIG. 3. FIG. 3 is a block diagram schematically illustrating an example of the configuration of the communication system 100 according to the present example embodiment.

As illustrated in FIG. 3, the communication system 100 includes a communication control apparatus 1, a ground base station 4 (ground base stations 4a to 4c), a non-terrestrial network base station 5 (hereinafter, also referred to as "NTN base station 5"), and a communication terminal 8 (communication terminals 8a to 8c).

The ground base station 4 and the NTN base station 5 function as a plurality of base stations. Examples of the NTN base station include low earth orbit (LEO) satellites, high altitude platform stations (HAPSs), and unmanned aerial vehicles (UAVs). A plurality of the communication terminals 8 (communication terminals 8a to 8c) communicate with any one of the plurality of base stations (the ground base station 4 and the NTN base station 5). The number of the ground base stations 4, the number of the NTN base stations 5, and the number of the communication terminals 8 included in the communication system 100 are not limited.

Each of the ground base stations 4 can change a beam direction of an electric wave to be transmitted. The ground base station 4 can switch between, for example, the beam directions #0 to #5 (see FIG. 9 described later). In one example, the ground base station 4a can transmit an electric wave in at least one selected from the group consisting of the beam direction #1, the beam direction #2, and the beam direction #5, as illustrated in FIG. 3.

Similarly, the NTN base station 5 can change the beam direction. The NTN base station 5 includes a plurality of antennas. The NTN base station 5 may change the beam direction so that a portion of a range in which the electric wave reaches in a case where the electric wave is transmitted from all of the plurality of antennas (hereinafter, also referred to as "cell range") is set to be outside the cell range. Specifically, the NTN base station 5 can cause a portion of the cell range to be outside the cell range by causing some of the plurality of antennas not to transmit electric waves (see FIG. 14 described later).

The ground base station 4 communicates with the communication terminals 8 that are located in the cell range.

In one example, as illustrated in FIG. 3, the communication terminal 8a communicates with the ground base station 4b and the communication terminal 8b communicates with the ground base station 4c. Further, the NTN base station 5 communicates with the communication terminal 8 that is outside a cell range of the ground base station 4 and that is located within the cell range CS of the NTN base station 5. In one example, as illustrated in FIG. 3, the communication terminal 8c communicates with the NTN base station 5. The NTN base station 5 may communicate with the communication terminal 8 (e.g., the communication terminal 8a) in the cell range of the ground base station 4.

The communication terminal 8 is located in any one of a plurality of areas. Examples of the areas include a plurality of areas (hereinafter, also referred to as "meshes") that partitions a space (see meshes M11 to M13 in FIG. 11 described later). Such meshes are set in a wide space. Therefore, even in a case where the communication terminal 8 is moved, the communication terminal 8 is located in any one of the meshes.

The meshes can be identified by, for example, the numbers 1, 2, . . . i, respectively.

The communication terminal 8 can also change a directivity direction of an antenna 83, similarly to the base stations (the ground base station 4 and the NTN base station 5). As will be described later, the communication terminal 8 can control the directivity direction of the antenna 83 on the basis of instruction information from the communication control apparatus 1, and communicate with an appropriate base station. As a result, efficient use of the plurality of base stations becomes possible.

The communication control apparatus 1 determines, on the basis of terminal location prediction information TI and an electric wave environment database DB, a directivity direction of each of the plurality of base stations and a directivity direction of each of antennas 83 through which the plurality of communication terminals 8 carry out transmission. The communication control apparatus 1 transmits a determination result to the base stations (the ground base station 4 and the NTN base station 5) and the communication terminals 8. This determination result is transmitted to the ground base station 4 via the Internet NW1 and a core network NW2. Meanwhile, this determination result is transmitted to the NTN base station 5 via the Internet NW1, the core network NW2 and a parabolic antenna of a gateway GW. The determination result of the directivity direction of the antenna 83 of the communication terminal 8 is transmitted to the communication terminal 8 via the ground base station 4 or the NTN base station 5. The communication terminal 8 changes the directivity direction of the antenna 83 according to the directivity direction of the antenna 83 of the communication terminal 8 which has been transmitted.

(Configuration of Communication Control Apparatus 1)

Figure 4:
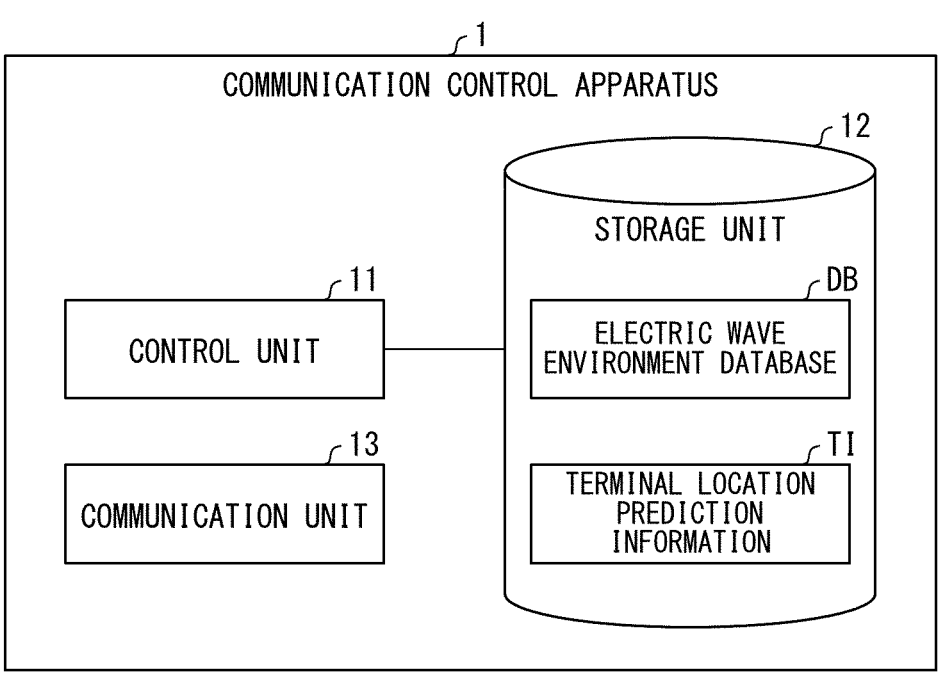
FIG. 4 is a block diagram illustrating a configuration of a communication control apparatus according to the second example embodiment of the present invention.

The configuration of the communication control apparatus 1 according to the present example embodiment will be described with reference to FIG. 4. FIG. 4 is a block diagram illustrating a configuration of the communication control apparatus 1 according to the present example embodiment. The communication control apparatus 1 includes a control unit 11, a storage unit 12, and a communication unit 13, as illustrated in FIG. 4.

The control unit 11 carries out a communication control method S2, which will be described later. The control unit 11 can include, for example, at least one processor C1 and at least one memory C2. A program P for operating the processor C1 is stored in the memory C2. The processor C1 reads the program P from the memory C2 and carries out the communication control method S2.

The processor C1 may be, for example, a central processing unit (CPU), a graphic processing unit (GPU), a digital signal processor (DSP), a micro processing unit (MPU), a floating point number processing unit (FPU), a physics processing unit (PPU), a Tensor Processing Unit (TPU), a quantum processor, a microcontroller, or a combination thereof. The memory C2 may be, for example, a flash memory, a hard disk drive (HDD), a solid state drive (SSD), or a combination thereof.

The program P can also be stored in a non-transitory tangible storage medium M from which the computer C can read the program P. Such a storage medium M may be, for example, a tape, a disk, a card, a semiconductor memory, a programmable logic circuit, or the like. The processor C1 can acquire the program P via the storage medium M. The program P can also be transmitted via a transmission medium. The transmission medium may be, for example, a communication network, a broadcast wave, or the like. The computer C can acquire the program P also via such a transmission medium.

The storage unit 12 stores data that is to be referred to by the control unit 11. Examples of the data stored in the storage unit 12 include the electric wave environment database DB and the terminal location prediction information TI. The storage unit 12 may have base station location information T2 that indicates locations of the plurality of base stations (the ground base station 4 and the NTN base station 5). Since the NTN base station 5 moves, it is preferable that the base station location information T2 has information on a location of the NTN base station 5 that is associated with time.

The communication unit 13 is an interface that transmits and receives data. An example of the data to be received by the communication unit 13 is the terminal location prediction information TI. Examples of the data to be transmitted by the communication unit 13 include instruction information, which indicates the directivity direction, the beam direction, or a frequency of the antenna 83, to the ground base station 4, the NTN base station 5, or the communication terminal 8.

(Configuration of Ground Base Station 4)

The ground base station 4 includes a control unit 41, a communication unit 42, and an antenna 43, as illustrated in FIG. 5.

The control unit 41 changes the beam direction and the frequency on the basis of the instruction information from the communication control apparatus 1. The control unit 41 can include at least one processor C1 and at least one memory C2, similarly to the control unit 11 of the communication control apparatus 1.

The communication unit 42 is an interface that transmits and receives data. Examples of the data to be received by the communication unit 42 include the instruction information that indicates the beam direction, a transmission power, or the frequency of an electric wave to be transmitted.

The antenna 43 is an apparatus for transmitting and receiving an electric wave. The antenna 43 transmits and receives an electric wave in the beam direction instructed by the control unit 41 and at the transmission power and the frequency which has been instructed by the control unit 41.

(Configuration of NTN Base Station 5)

The NTN base station 5 includes a control unit 51, a communication unit 52, and an antenna 53, as illustrated in FIG. 5.

The control unit 51 changes the beam direction and the frequency on the basis of the instruction information from the communication control apparatus 1. The control unit 51 can include at least one processor C1 and at least one memory C2, similarly to the control unit 11 of the communication control apparatus 1.

The communication unit 52 is an interface that transmits and receives data. Examples of the data to be received by the communication unit 52 include the instruction information that indicates the beam direction or the frequency of an electric wave to be transmitted.

The antenna 53 is an apparatus for transmitting and receiving an electric wave. The antenna 53 transmits and receives an electric wave in the beam direction instructed by the control unit 51 and at the frequency instructed by the control unit 51.

The antenna 53 may also have a plurality of antenna elements. By setting the antenna 53 such that some of the antenna elements do not to transmit the electric wave, a portion of a cell range of a case where all of the plurality of antenna elements transmit the electric wave can be set to be outside the cell range (see FIG. 14 described later).

(Configuration of Communication Terminal 8)

The communication terminal 8 includes a control unit 81, a communication unit 82, and an antenna 83, as illustrated in FIG. 5.

The control unit 81 changes the directivity direction of the antenna 83 and the frequency of an electric wave, on the basis of the instruction information from the communication control apparatus 1. The control unit 81 can include at least one processor C1 and at least one memory C2, similarly to the control unit 11 of the communication control apparatus 1.

The communication unit 82 is an interface that transmits and receives data. Examples of the data received by the communication unit 82 include the instruction information that indicates the directivity direction of the antenna 83 or the frequency of an electric wave to be transmitted and received.

The antenna 83 is an apparatus for transmitting and receiving an electric wave. The antenna 83 may be any antenna that can adjust the directivity direction of the antenna 83, for example, a phased array antenna. The antenna 83 changes, by control of the control unit 81, the directivity direction of the antenna 83 and the frequency of the electric wave to be transmitted and received. Note that in the following, the directivity direction of the antenna 83 may also be referred to as "direction of the antenna 83".

The antenna 83 may include a directional first antenna element and a non-directional second antenna element. The non-directional second antenna element facilitates reception of the instruction information prior to connection of the first antenna element to the base station. Note that the instruction information may be received by the first antenna element or the second antenna element.

In this case, it is preferable that a first frequency of the electric wave transmitted by the first antenna element differs from a second frequency of the electric wave transmitted by the second antenna element. Then, the first and second antenna elements can carry out simultaneous communication. It is possible to use, for example, a frequency in the Sub 6 band as the second frequency.

(Terminal Location Prediction Information TI)

The terminal location prediction information TI is information in which a location of each of the plurality of communication terminals 8 is predicted. In one example, the terminal location prediction information TI is generated on the basis of a history of location information which has been acquired from each of the plurality of communication terminals 8. An example of a method in which the control unit 11 of the communication control apparatus 1 generates the terminal location prediction information TI will be described below. The terminal location prediction information TI may be generated by another apparatus, and the communication control apparatus 1 may acquire the terminal location prediction information TI that has been generated by the another apparatus.

For example, the control unit 11 acquires location information from each of the plurality of communication terminals 8 and associates and stores, in the storage unit 12, the location information with the date and time that have been acquired. An example of the location information is location information which is acquired by the communication terminal 8 with use of a global positioning system (GPS). The control unit 11 generates the terminal location prediction information TI in which the location of the communication terminal 8 at a certain time is predicted, on the basis of the location information that is acquired at the certain time. The control unit 11 may generate the terminal location prediction information TI. In the terminal location prediction information TI, which one of meshes the communication terminal 8 is located is predicted.

(Electric Wave Environment Database DB)

The electric wave environment database DB is a database in which the following are associated with each other: a plurality of base stations; beam directions of respective electric waves from the base stations; a plurality of areas (e.g., meshes), and reception powers of the respective electric waves in the plurality of areas.

The "reception powers" is each a reception power of an electric wave in an associated area. Examples of the reception power includes a distribution of the reception power of the electric wave in a three-dimensional space indicated by the associated area or an average value of the distribution.

The electric wave environment database DB includes, for example, a reception power in a case where a base station, a beam, and a mesh are specified. For example, in a case where (a) the base station is specified by a numeral n, and (b) the beam and the mesh of the electric wave from the base station are specified by numerals m and i, respectively, a reception strength Pnmi is stored. As a result, in a case where the communication terminal 8 located in the mesh i receives the beam m from the base station n, it is possible to calculate a level of interference (for example, Signal-to-Interference plus Noise power Ratio (SINR), which will be described later) that a given interference signal I gives to a desired signal S.

Here, the reception strength P in the electric wave environment database DB may be a value in consideration of the directivity direction of the antenna 83 of the communication terminal 8. For example, on the assumption that the antenna 83 has a plurality of directions, one of the directions can be specified by a numeral k, and the reception strength Pnmi can be replaced with the reception strength Pnmik. In this case, the electric wave environment database DB is a database in which the following are associated with each other: a plurality of base stations; beam directions of respective electric waves from the base stations; a plurality of areas (e.g., meshes), directions of the antenna 83 in each of the areas and a reception power of an electric wave at the antenna 83 in each of the plurality of areas. In this configuration, it is possible to calculate, on the basis of the electric wave environment database DB, the level of interference in consideration of the direction of the antenna 83 of the communication terminal 8.

Meanwhile, the reception strength P in the electric wave environment database DB may be a value in which the directivity of the antenna 83 of the communication terminal 8 is eliminated. In this case, the electric wave environment database DB retains the reception strength Pnmi on the assumption that the antenna 83 of the communication terminal 8 is non-directional. At this time, it is possible to correct the reception strength Pnmi on the basis of the magnitude of a deviation of the direction (the directivity direction) of the antenna 83 of the communication terminal 8 with respect to a direction from the communication terminal 8 toward the base station which is a target of communication.

For example, it is possible to correct the reception strength Pnmi by the following Formula (1).

$$Pnmi(\theta) = Pnmi * G(\theta) \qquad \text{Formula (1)}$$

Pnmi($\theta$): Reception strength after correction

Pnmi: Reception strength before correction $\theta$: Angle $\theta$ of the direction (directivity direction) of the antenna 83 of the communication terminal 8 with respect to the direction from the communication terminal 8 toward a base station which is a target of communication G($\theta$): Antenna gain of the antenna 83 of the communication terminal 8, which is a positive coefficient that is maximum when $\theta$ is 0 and that becomes smaller as $\theta$ changes from 0

That is, when $\theta$ is 0, the antenna 83 faces in the direction of the base station that is a target of communication and the reception strength of an electric wave from the base station becomes maximum (G($\theta$) is maximum). Then, as $\theta$ changes from 0, the reception strength of the electric wave from the base station becomes smaller (G($\theta$) becomes smaller).

Note that the direction from the communication terminal 8 to the base station that is a target of communication can be calculated on the basis of the terminal location prediction information TI and the base station location information T2 (that indicates the locations of the plurality of base stations).

By using the reception strength Pnmi($\theta$) thus corrected, it is possible to calculate the reception strength P in consideration of the direction of the antenna 83 and thus the level of interference in consideration of the direction of the antenna 83. The following description assumes that in a case where the direction of the antenna 83 (the directivity direction of the antenna 83) of the communication terminal 8 is considered, the reception strength Pnmi in the electric wave environment database DB is corrected on the basis of the angle $\theta$ (a deviation of the direction of the antenna 83 with respect to the direction of the base station).

The electric wave environment database DB may include information on the time and the frequency of an electric wave that is used for communication between the base station and the communication terminal 8. In this case, for example, it is easy to change, on the basis of the electric wave environment database DB, the frequency of the beam of the electric wave transmitted by the base station to a frequency at which the level of interference with the electric wave with a beam of an electric wave from another base station is small. Further, it also becomes easy to deal with to a temporal change in the beam direction or intensity of the electric wave that is transmitted from the base station. For example, since the NTN base station 5 periodically moves in the sky, the location and the beam direction of the NTN base station 5 periodically change.

(Flow of Communication Control Method S2)

Figure 8:
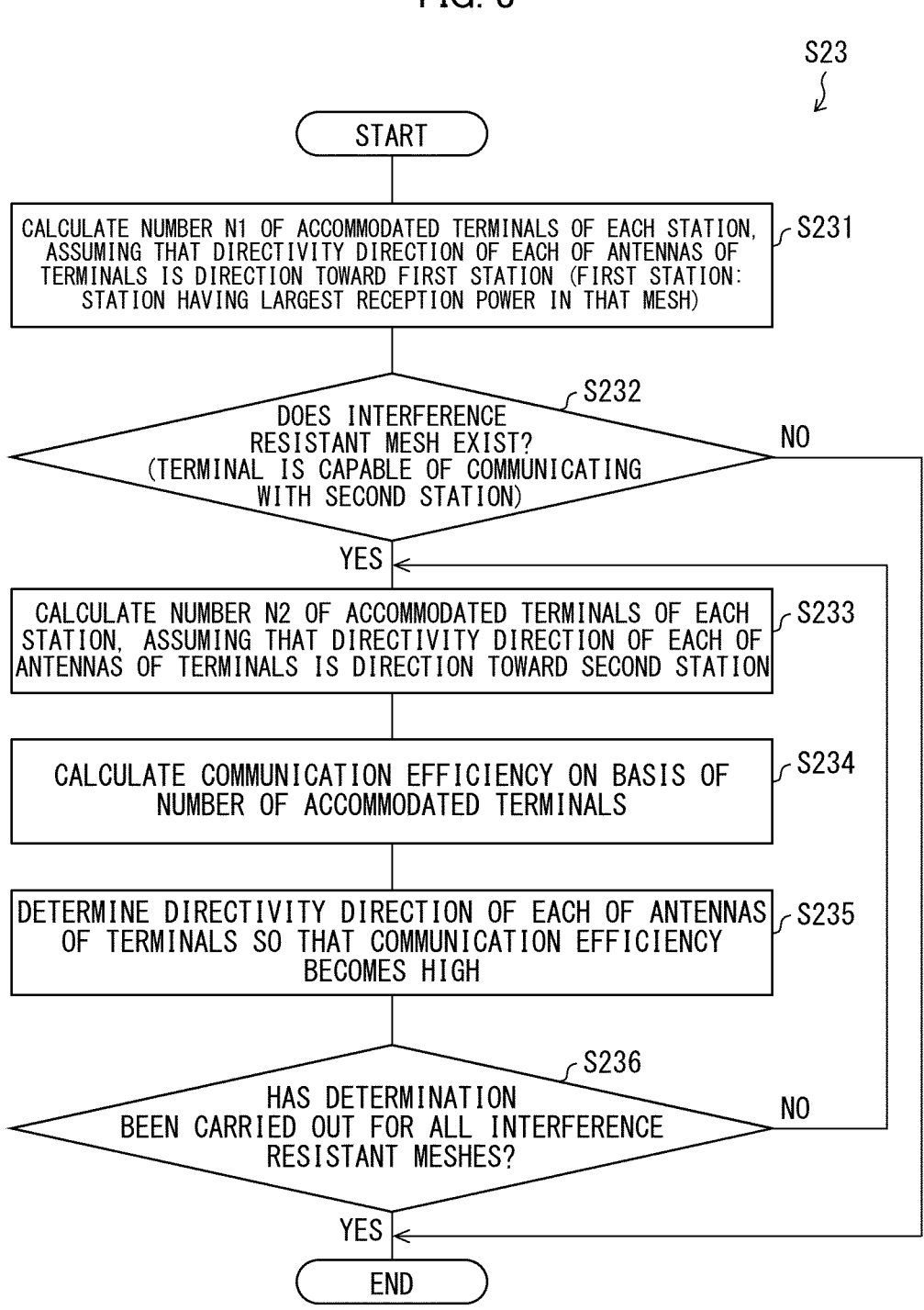
FIG. 8 is a chart illustrating an example of a part of a flow of the communication control method according to the second example embodiment of the present invention.

The following will discuss a flow of a communication control method S2 in accordance with the present example embodiment, with reference to FIG. 6. FIG. 6 is a flowchart showing the flow of the communication control method S2 according to the present example embodiment. FIGS. 7 and 8 each are a flowchart showing the details of steps S21 or S23 of FIG. 6.

The communication control method S2 is a method in which the communication control apparatus 1, in particular, the control unit 11 controls base stations (a ground base station(s) 4 and an NTN base station 5) and a communication terminal(s) 8. Note, however, that steps S21 to S25 of the communication control method S2 are used to determine the best beam direction of each of the base station(s) and the communication terminal(s) 8, and in these steps, the communication control apparatus 1 does not need to control the base station(s) and the communication terminal(s) 8. In step S26, control based on the beam direction determined in steps S21 to S25 is carried out. The communication control method S2 may be repeatedly carried out at predetermined time intervals (e.g., 30 minute intervals).

A. Determine, by the control unit 11, the beam direction of an electric wave from each of ground base stations 4 so that the number of communication terminals 8 (the number of accommodated terminals) that receive the beam of the electric wave from each of the ground base stations 4 becomes largest (step S21).

This step S21 can be divided into steps S211 to S215 shown in FIG. 7.

(1) The control unit 11 determines the beam direction of an electric wave from each of the ground base stations 4 such that the number of the communication terminals 8 that receive electric waves from the ground base stations 4 (the total number of the accommodated terminals of the ground base stations 4) is largest (step 211).

At this stage, interference meshes described later are not considered. Further, it is assumed that the directivity direction of each of the antennas 83 of the communication terminals 8 is set to a direction toward a ground base station 4 which transmits an electric wave of the largest reception power in each mesh in the electric wave environment database DB. In other words, here, a change in the reception power due to the direction of the antenna 83 of the communication terminal 8 can be ignored.

Figure 9:
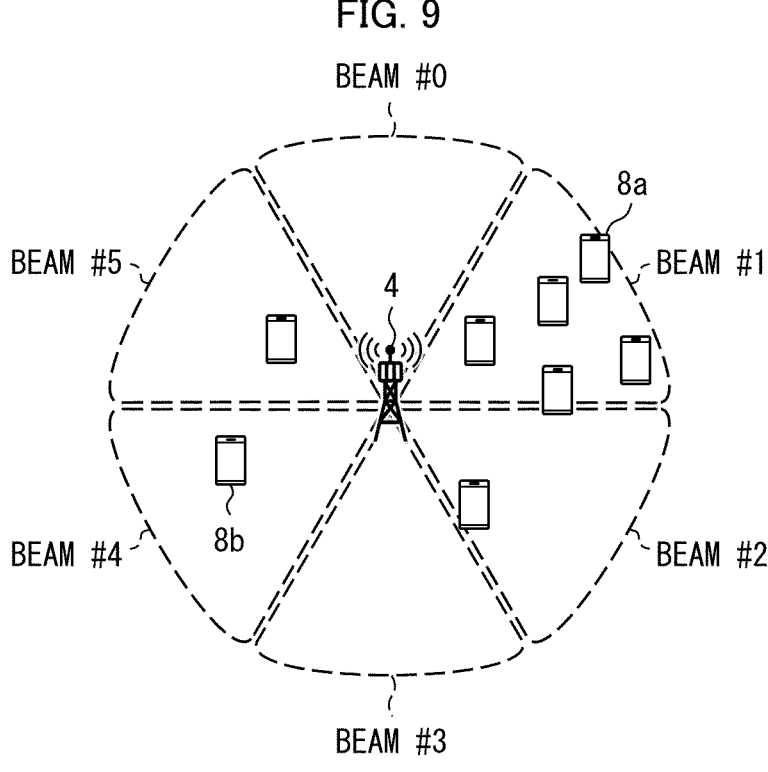
FIG. 9 is a diagram illustrating an example process for selecting a beam direction of an electric wave from a ground base station according to the second example embodiment of the present invention.

The control unit 11 can determine the beam direction of the electric wave of each of the ground base stations 4 on the basis of the terminal location prediction information TI. For example, as illustrated in FIG. 9, the control unit 11 selects a beam #1, an electric wave of which is received by the largest number of communication terminals 8. At this time, the ground base station 4 communicates with the communication terminal 8a that receives the beam #1 and does not communicate with the communication terminal 8b that receives the beam #4.

Figure 10:
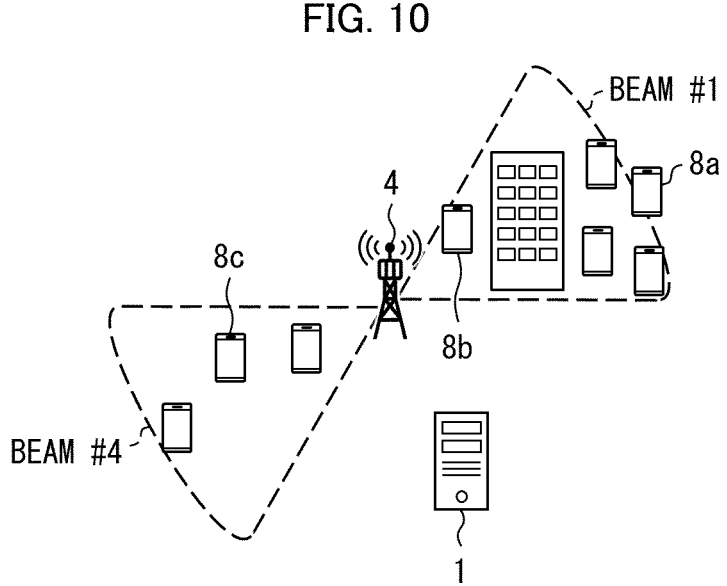
FIG. 10 is a diagram illustrating another example process for selecting a beam direction of an electric wave from a ground base station according to the second example embodiment of the present invention.

At this time, the control unit 11 can select the beam direction in which the number of accommodated terminals of each of the ground base stations 4 is largest, on the basis of the terminal location prediction information TI and the electric wave environment database DB. For example, it is assumed that, as illustrated in FIG. 10, in a range in which the electric wave of the beam #1 from the ground base station 4 is received, communication terminals 8 (e.g., communication terminal 8a) are located on the opposite side of a building with respect to the base station 4. At this time, in the electric wave environment database DB, the reception power in the mesh where the communication terminal 8a is located has a smaller value than that in a case where there is no building. In other words, the electric wave environment database DB retains the reception power in consideration of an effect of the building as well.

The control unit 11 counts the number of the communication terminals 8 that have a reception power not less than a predetermined value, as the number of the communication terminals 8 that are to receive the electric wave transmitted. Here, since the communication terminal 8a located on the opposite side of the building with respect to the ground base station 4 has a reception power that is less than the predetermined value, this communication terminal 8a is not counted in the number of the communication terminals 8 that are to receive the electric wave transmitted. As a result, the control unit 11 calculates the number of the communication terminals 8 that receive the beam #1 and the number thus calculated is one, which corresponds to the number of the communication terminal 8b. On the other hand, the control unit 11 determines that the reception power of each of all the communication terminals 8 in the range in which the beam #4 is received is not less than a predetermined value, and calculates the number of the communication terminals 8 that are to receive the beam #4 and the number thus calculated is three including the communication terminal 8c. As described above, the control unit 11 uses the electric wave environment database DB. Thus, it is possible for the control unit 11 to select the beam direction of each of the ground base stations 4 so that consequently, the number of the communication terminals 8 having a reception power of not less than the predetermined value as the reception power of the electric wave transmitted by the ground base station 4 is largest in consideration of the effect of the building.

(2) The control unit 11 determines whether or not an interference mesh is generated (step S212).

The control unit 11 identifies an area (e.g., an interference mesh) in which the level of interference caused by the respective electric waves transmitted by the plurality of base stations is not less than a predetermined level, on the basis of the terminal location prediction information TI and the electric wave environment database DB. The interference mesh means a mesh in which the level of interference between the electric waves of the ground base stations 4 is not less than a predetermined level. For example, in a case where in a certain mesh, the level at which interference occurs on a beam of an electric wave of the largest reception power from the ground base station 4 due to a beam of an electric wave from another ground base station 4 is not less than a predetermined level, such a certain mesh is an interference mesh.

The control unit 11 calculates, for example, an SINR as the level of interference in a mesh #10 with use of the following Formula (2). Here, it is assumed that in the mesh #10, the reception power of the beam #1 from the ground base station #1 is largest.

$$SINR = P_{1,1,10} / \left( \sum P_{i,j,10} + N \right) \tag{2}$$

$P_{1,1,10}$: reception power of the beam #1 from the ground base station #1 (largest reception power), in the mesh #10

$\sum P_{i,j,10}$: sum of reception powers of respective beams from ground base stations other than the ground base station #1, in the mesh #10

N: Noise power

The control unit 11 determines, if the level of interference in the mesh #10 is not less than the predetermined level, that the mesh #10 is an interference mesh (step S212).

For example, in a case where the level of interference calculated is an SINR, the control unit 11 determines, if the following Formula (3) is satisfied, that the level of interference is not less than the predetermined level and that the mesh #10 is an interference mesh.

$$SINRth \leq SINRd \qquad (3)$$

SINRd: a desired value of the SINR for establishment of communication

SINRth: a value of the SINR with which cumulative probability is Pout in an SINR distribution Pout: Acceptable probability of communication breakdown Note that in a case where the following Formula (4) is satisfied, the control unit 11 determines that the level of interference is less than the predetermined level and then that the mesh #10 is an interference-free mesh.

$$SINRth > SINRd \qquad (4)$$

In this determination, it is preferable that the control unit 11 consider the direction of the antenna 83 of the communication terminal 8. For example, the control unit 11 assumes that the antennas 83 of the communication terminals 8 in the mesh face in the direction of the ground base station 4 which transmits a beam of an electric wave of the largest reception power in the mesh. On this assumption, the control unit 11 corrects the reception power and calculates the level of interference. As described above, for example, the reception power can be corrected with use of Formula (1).

(3) The control unit 11 determines, in a case where no interference mesh is present, that the directivity direction of each of the antennas 83 of the communication terminals 8 is set to a direction toward the ground base station 4 which transmits an electric wave of the largest reception power in each mesh in the electric wave environment database DB (step S215).

(4) In a case where an interference mesh is present, the control unit 11 determines, in consideration of the interference mesh, the beam directions of electric waves from the ground base stations 4 so that the number of the communication terminals 8 that receive the electric wave from the ground base station 4 (the total number of the accommodated terminals of the ground base station 4) becomes largest (steps S213 and S214).

In a case where there is an interference mesh, the control unit 11 changes the beam direction of the electric wave from the ground base station 4 which has the largest effect on the level of interference in the interference mesh. This is intended to increase the number of the communication terminals 8 that receive the electric wave (the total number of the accommodated terminals of the ground base station 4) (step S213). In other words, the control unit 11 identifies, in an area identified (e.g., interference mesh), a base station that has the largest effect on the level of interference, and determines the direction of the electric wave beam from the base station thus identified.

The ground base station 4 which has the largest effect on the level of interference is, for example, a ground base station 4 which transmits, in the mesh, a beam of an electric wave whose reception power is the second largest next to the largest reception power. The control unit 11 adjusts the beam direction of the electric wave from a direction in which the number of the communication terminals 8 (the number of the accommodated terminals) that receive the electric wave from the ground base station 4 which has the largest effect on the level of interference is largest to a direction in which the number of the accommodated terminals is the second largest. This adjustment reduces interference in the interference mesh. Accordingly, in this mesh, the number of the communication terminals 8 that can communicate with the ground base station 4 which transmits an electric wave of the largest reception power increases, and thus the total number of the accommodated terminals of this ground base station 4 may increase.

After the beam directions of the ground base stations 4 in all of the interference meshes are adjusted as described above, the control unit 11 determines respective beam directions of the communication terminals 8 so that the beam directions correspond to the beam directions of the ground base stations 4 (step S215). The control unit 11 determines the directivity direction of each of the antennas 83 of the communication terminals 8 located in the area identified, so as to cause the directivity direction to correspond to the beam direction, which has been determined, of the electric wave from the base station. That is, since the beam directions of the ground base stations 4 have been adjusted, the ground base station 4 that transmits the beam of the largest reception power in the mesh is changed. As a result, the directivity direction of each of the antennas 83 of the communication terminals 8 is set to a direction toward the ground base station 4 which newly becomes a ground base station 4 that transmits an electric wave of the largest reception power.

B. Increase, by the control unit 11, the transmission power of the beam of the electric wave from the ground base station 4 to an extent that generates no interference mesh (step S22). This step further increases the total number of accommodated terminals of the ground base stations 4, so that efficient use of the base stations becomes possible.

For example, the transmission power is increased by a fixed value in the order from a base station which has a remaining transmission power and of which the number of accommodated terminals is larger. In a case where no interference mesh is generated by an increase in transmission power at a base station, the transmission power at the base station is further increased by a fixed value. On the other hand, in a case where an interference mesh is generated by an increase in transmission power at a base station, the transmission power at that base station is restored and then the transmission power at another base station of which the number of accommodated terminals is next largest is increased. Note that the interference mesh can be determined with use of the above-described Formula (2).

As described above, in all of the base stations each of which has a remaining transmission power, the transmission power is increased to an extent that generates no interference mesh, so that the transmission power is increased and consequently, the total number of the accommodated terminals of the base stations is increased. At this time, it is preferable to adjust the directivity direction of each of the antennas 83 of the communication terminals 8 each time the transmission power is increased.

C. Adjust, by the control unit 11, the directivity direction of each of the antennas 83 of the communication terminals 8 so as to maximize communication efficiency (throughput) in the communication system 100 as a whole (step S23).

This step S23 can be divided into steps S231 to S236 shown in FIG. 8.

(1) The control unit 11 calculates the number N1 of accommodated terminals of each of the base stations on the basis of the terminal location prediction information TI on the assumption that in each mesh, the directivity direction of each of the antennas 83 of the communication terminals 8 is set to a direction toward the ground base station 4 (maximum power station: main cell) which transmits an electric wave of the largest reception power (step S231).

(2) The control unit 11 determines, on the basis of the electric wave environment database DB, whether or not an area (e.g., interference resistant mesh) having a level of specific interference of not more than a predetermined level is present (step S222).

The level of specific interference is defined as a level at which the beam of the first electric wave from the first base station interferes with the beam of the second electric wave from the second base station in a case where the directivity direction of each of the antennas 83 of the communication terminals 8 in a predetermined area is set to not a direction toward a first base station (that transmits a beam of an electric wave of a first reception strength in the predetermined area) but a direction toward a second base station (that transmits a beam of an electric wave of a second reception strength in the predetermined area, the second reception strength being lower than the first reception strength). For example, the beam of the first electric wave is at a largest reception power in the predetermined area, and the beam of the second electric wave is at a second largest reception power, which is the second largest next to the reception power of the beam of the first electric wave, in the predetermined area.

The control unit 11 calculates an SINR2 as the level of specific interference in the mesh #10, for example, with use of the following Formula (5). In this example, it is assumed that in the mesh #10, a beam #1 from the ground base station #1 has the largest reception power and the beam #2 from the ground base station #2 has the second largest reception power.

$$SINR2 = P_{2,2,10}(0)/(P_{1,1,10}(\theta) + N) \tag{5}$$

$P_{1,1,10}(\theta)$: Reception power of the beam #1 from the ground base station #1, at an antenna 83 of a communication terminal 8 in the mesh #10, in a case where the antenna 83 is set to face in a direction toward the ground base station #2.

$P_{2,2,10}(0)$: Reception power of the beam #2 from the ground base station #2, at the antenna 83 of the communication terminal 8 in the mesh #10, in a case where the antenna 83 is set to face in a direction toward the ground base station #2

$\theta$: The direction of the ground base station #1 with respect to the direction of the antenna 83 of the communication terminal 8 in a case where the antenna 83 is set to face in the direction toward the ground base station #2

N: Noise power

Note that in a case where the antenna 83 of the communication terminal 8 is set to the direction toward the ground base station #2, the direction of the ground base station #2 with respect to the direction of the antenna 83 is $\theta=0$ as shown in "$P_{2,2,10}(0)$".

By changing the direction of the antenna 83, the reception powers, at the antenna 83, of the electric waves from the first and second base stations are changed. In other words, by directing the antenna 83 toward the second base station which transmits an electric wave whose maximum reception power is small, the reception power of the second electric wave from the second base station tends to increase, and on the other hand, the first electric wave, which transmits an electric wave whose maximum reception power is large, from the first base station tends to decrease. As a result, by directing the antenna 83 toward the second base station, the communication terminal 8 may become capable of communicating with the second base station while receiving substantially no interference (a level of specific interference; e.g., an SINR2 of not more than the predetermined value Th2) caused by the first base station, which transmits an electric wave whose maximum reception power is large. Here, a mesh capable of carrying out such communication is referred to as an interference resistant mesh.

(3) In a case where there is an interference resistant mesh, the control unit 11 selects the interference resistant mesh. Then, the control unit 11 calculates the number of accommodated terminals N2 of each base station in a case where the directivity direction of each of the antennas 83 of the communication terminals 8 in the interference resistant mesh is set to the direction toward the ground base station 4 which has a next largest reception power following the first base station (step S233).

(4) Further, the control unit 11 calculates communication efficiency (throughput) of the communication terminals 8 in each of respective cases of the numbers N1 and N2 of the accommodated terminals (step S234). Then, the control unit 11 determines the number N1 or N2 of accommodated terminals with which communication efficiency is more preferable, and ultimately determines the directivity direction of each of the antennas 83 of the communication terminals 8 (step S235).

In general, it is considered that a high communication efficiency can be obtained in a case where communication terminals 8 communicate with a ground base station 4 which transmits an electric wave of the largest reception power. However, when the number of accommodated terminals of the ground base station 4 which transmits an electric wave having the largest reception power increases, the communication efficiency with that ground base station 4 tends to become lower. Accordingly, the communication efficiency is calculated in consideration of both of the reception power and the number of accommodated terminals.

Figure 11:
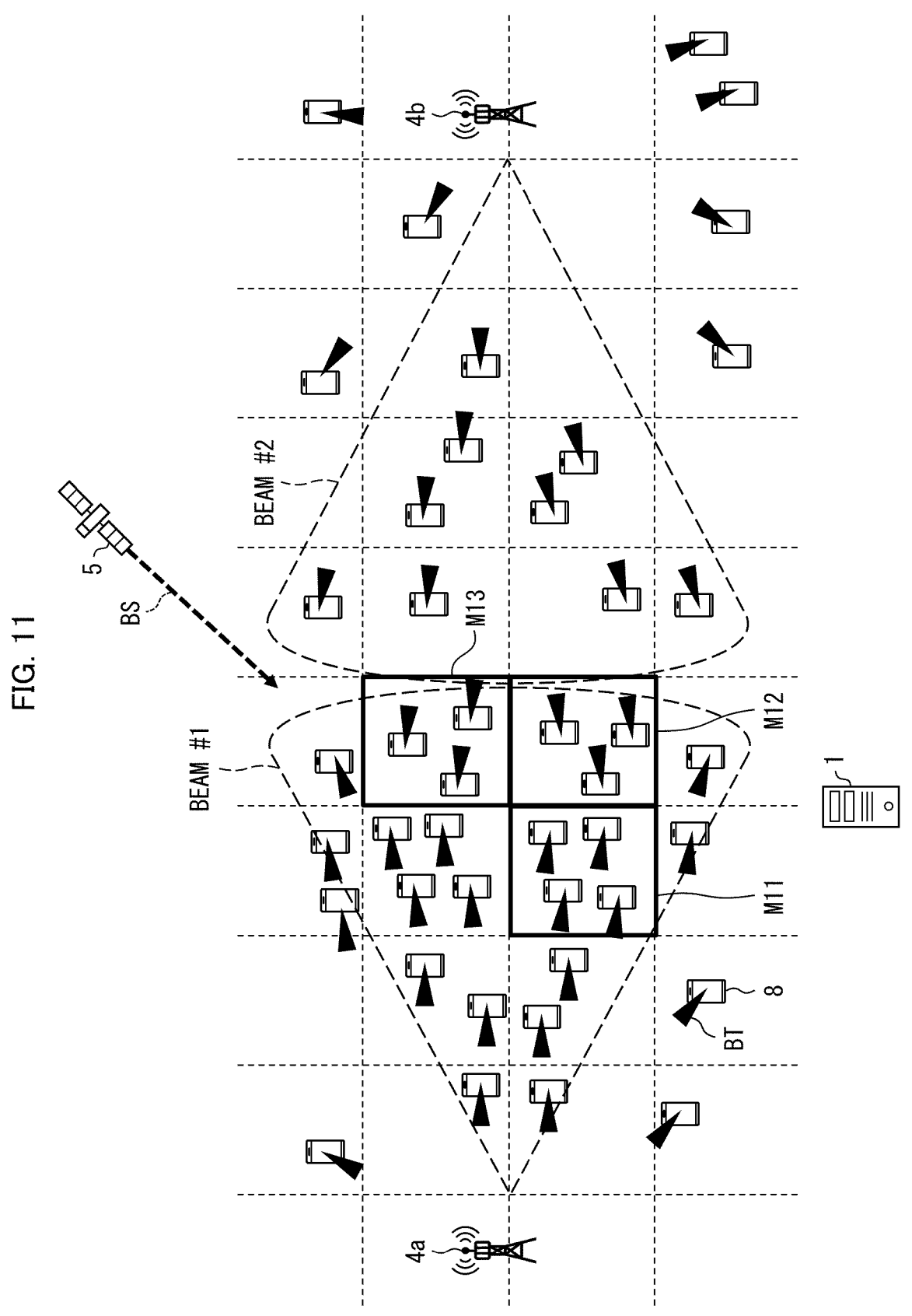
FIG. 11 is a diagram illustrating an example process for changing a directivity direction of an antenna of the communication terminal according to the second example embodiment of the present invention.

That is, the directivity direction of each of the antennas 83 of the communication terminals 8 is set to the direction toward the second base station, in a case where the communication efficiency becomes higher when the antenna 83 is set to face in the direction toward the second base station than in a direction toward the first base station. For example, as illustrated in FIG. 11, in a mesh, such as the mesh M11, in which the beam of the electric wave from the base station 4a is at the highest reception power, the directivity direction BT of each of the antennas 83 of the communication terminals 8 can be principally set to a direction toward the base station 4a (first base station). However, in a mesh (interference resistant mesh), such as meshes M12 and M13, in which reception from the base station 4b (second base station) transmitting an electric wave of a second largest reception power next to the base station 4a is possible, the directivity direction BT of each of the antennas 83 of the communication terminals 8 can be set to a direction toward the base station 4b.

In this way, for each of (a) a case where the directivity direction BT of each of the antennas 83 of the communication terminals 8 in the meshes M12 and M13 are set to the direction toward the base station 4a and (b) a case where the directivity direction BT is set to the direction toward the base station 4b, the respective numbers of accommodated terminals of the base station 4a and the base station 4b are calculated. In a case where the directivity direction BT of each of the antennas 83 of the communication terminals 8 in the meshes M12 and M13 is set to the direction toward the base station 4a, the number of accommodated terminals of the base station 4a is 28 and the number of accommodated terminals of the base station 4b is 16. On the other hand, the directivity direction BT of each of the antennas 83 of the communication terminals 8 in the meshes M12 and M13 are set to a direction toward the base station 4b, six of the communication terminals 8 in the meshes M12 and M13 change the directivity direction BT of each of the antennas 83. As a result, the number of accommodated terminals of the base station 4a is 22, and the number of accommodated terminals of the base station 4b is also 22. In consideration of such difference in the number of accommodated terminals, the communication efficiency is calculated for each of (a) the case where the directivity direction BT of each of the antennas 83 of the communication terminals 8 in the meshes M12 and M13 is set to the direction toward the base station 4a and (b) the case where the directivity direction BT of each of the antennas 83 of the communication terminals 8 in the meshes M12 and M13 is set to the direction toward the base station 4b. Then, the directivity direction BT of each of the antennas 83 of the communication terminals 8 in the meshes M12 and M13 is determined.

The control unit 11 calculates, on the basis of the terminal location prediction information, (a) a first communication efficiency in a case where the directivity direction of each of the antennas 83 of the communication terminals located in a predetermined area is set to the direction toward the first base station and (b) a second communication efficiency in a case where the directivity direction of each of the antennas of the communication terminals located in the predetermined area is set to the direction toward the second base station. Then, the control unit 11 determines, on the basis of the first and second communication efficiencies, the directivity direction of the antennas 83 of the communication terminals located in the predetermined area. More specifically, the control unit 11 calculates (a) the first number of the communication terminals 8 that are located in a predetermined area and that are capable of communicating with the first terminal station in a case where the directivity direction of each of the antennas 83 is set to the direction toward the first base station and (b) the second number of communication terminals that are located in the predetermined area and that are capable of communicating with the second terminal station in a case where the directivity direction of each of the antennas 83 is set to the direction toward the second base station. The control unit 11 then calculates the first communication efficiency on the basis of the first number and the second communication efficiency on the basis of the second number. In one example, a possible communication speed V per base station is divided by the number of accommodated terminals N, so that a communication speed E (=V/N) per one communication terminal 8 is calculated. The communication efficiency can be determined by the communication speed E. That is, it is possible to determine the quality of the communication efficiency by the magnitude of the communication speed E.

In FIG. 11, as an example, the number of accommodated terminals of each of the base stations 4a and 4b is calculated on the assumption that even communication terminals 8 outside the range of the beam #1 of the base station 4a and outside the range of the beam #2 of the base station 4b are directed toward the base station 4a or 4b which transmits an electric wave whose reception power is largest. Note, however, that when the number of accommodated terminals is calculated, it may be considered whether or not the terminals are within the range of the beam.

As described above, the control unit 11 can equalize the numbers of accommodated terminals of the base stations and improve the communication efficiency in the communication system 100 as a whole.

As illustrated in FIG. 8, the interference resistant mesh can be determined in all of the meshes. However, such determination may be limited to some of the meshes.

(5) In a case where there is an interference mesh, the control unit 11 may calculate as follows the number of accommodated terminals in consideration of the interference mesh. As described above, a mesh satisfying Formula (3) is an interference mesh, and a mesh satisfying Formula (4) is an interference-free mesh.

The control unit 11 calculates the number of the communication terminals 8 in each of interference-free meshes. The control unit 11 calculates the number of accommodated terminals of each of the base stations and the number of accommodated terminals in the communication system 100 as a whole, by summing up the numbers thus calculated of communication terminals 8 in the interference-free meshes. Note that in this calculation, the communication efficiency (throughput) of the communication terminals 8 may be considered. For example, the number of communication terminals 8 having a communication efficiency that is not less than a certain level is calculated.

In an interference mesh, the beam direction of a base station that has a large effect on the level of interference is changed. For example, it is assumed that the beam direction of the base station is set to a beam direction in which the number of communication terminals 8 that receive the beam is the next largest. In this way, the interference mesh may be changed to an interference-free mesh.

The control unit 11 calculates the number of communication terminals 8 in the interference-free mesh and further the number of accommodated terminals of each of the base stations and the number of accommodated terminals in the communication system 100 as a whole.

Consider a case where the beam direction of a base station, which has a large effect on the level of interference, is changed so as to increase the number of accommodated terminals in the communication system 100 as a whole. In this case, the beam direction of a base station, which has a large effect on the level of interference, is changed in another interference mesh and the number of accommodated terminals in the communication system 100 as a whole is calculated.

In the interference mesh, when the number of accommodated terminals in the communication system 100 as a whole becomes largest as a result of changing the beam direction of the base station that has a large effect on the level of interference, it is considered to change the beam direction of a base station of which the number of accommodated terminals is small. That is, the beam direction of such a base station is changed so as to increase the number of accommodated terminals in the communication system 100 as a whole. At this time, if an interference mesh is generated, changing the beam direction of the base station, which has a large effect on the level of interference, is considered.

Figure 12:
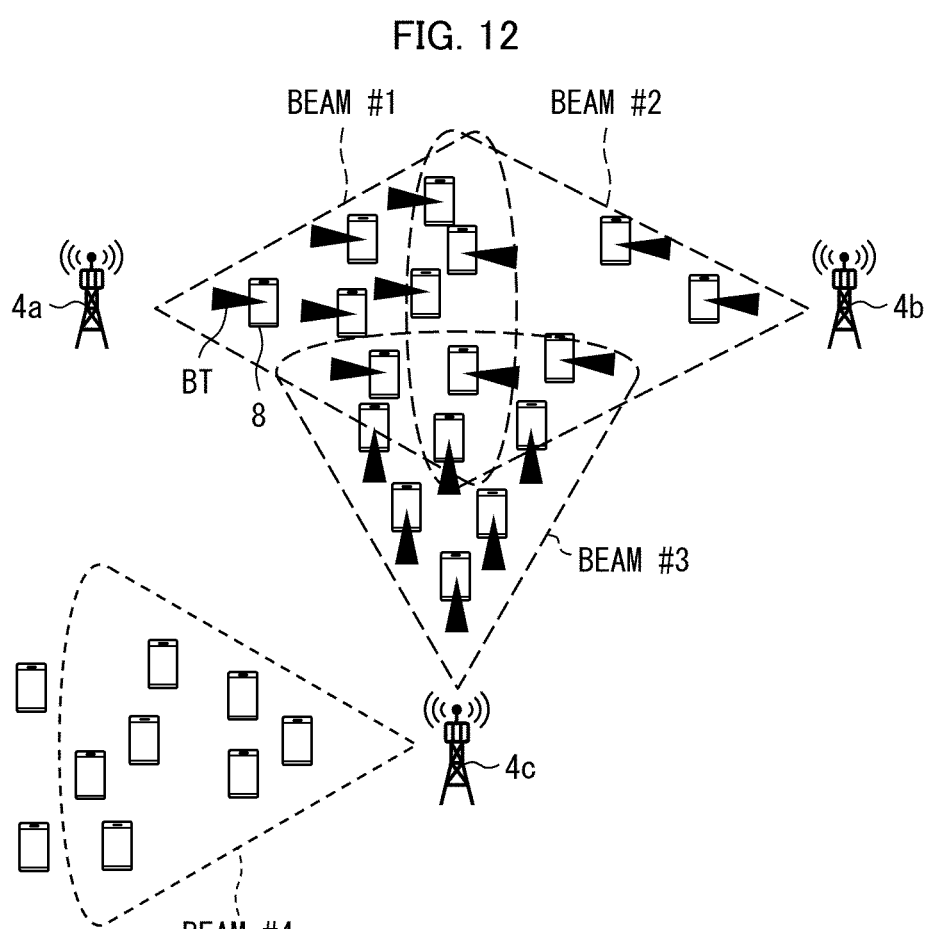
FIG. 12 is a diagram illustrating an example process for changing the beam direction of the electric wave from the ground base station according to the second example embodiment of the present invention.

As illustrated in FIG. 12, it is assumed that the beams #1 to #3 are transmitted from the base stations 4a to 4c, respectively. In this case, the beam #3 from the base station 4c is received by nine communication terminals 8. However, the beam #3 overlaps with the beams #1 and #2 from the base stations 4a and 4b. Therefore, the number of accommodated terminals of the base station 4c is six, and the total number of the accommodated terminals of the base stations 4a to 4c is 17.

Figure 13:
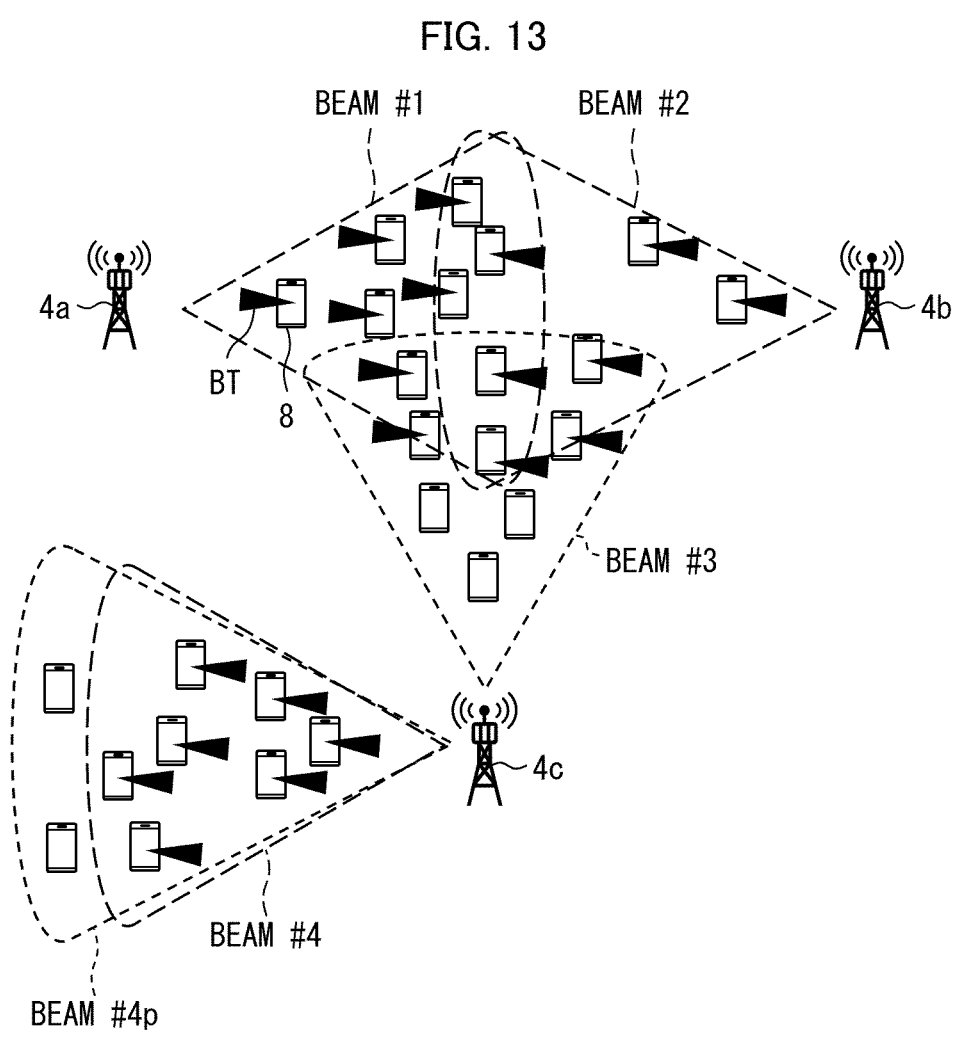
FIG. 13 is a diagram illustrating an example process for increasing a transmission power of the electric wave from the ground base station according to the second example embodiment of the present invention.

In contrast, in a case where the beam from the base station 4c is changed to the beam #4, the beam #4 from the base station 4c is received by seven communication terminals 8. Since the beam #4 does not overlap with the other beams, the number of the accommodated terminals of the base station 4c becomes also seven, so that the total number of the accommodated terminals of the base stations 4a to 4c is increased to 21. Note that, in this case, when the transmission strength of the beam #4 is increased and the beam #4 is changed to a beam #4p, the number of the accommodated terminals of the base station 4c increases to 9 as illustrated in FIG. 13.

D. Determine the communication terminals 8 that communicate with the NTN base station 5 and determine the beam direction of the NTN base station 5 (step S24).

For example, a communication terminal 8 incapable of communicating with the ground base station 4 with good communication efficiency is arranged to be capable of communicating with the NTN base station 5. In this case, the control unit 11 calculates, on the basis of the electric wave environment database DB, a level at which a beam of an electric wave from a non-terrestrial network (NTN) base station interferes with a communication terminal(s) 8 located in a predetermined area.

The control unit 11 calculates, with use of, for example, the following Formula (6), an SINR as a level at which the beam of the electric wave from the NTN base station 5 interferes with the beam of the electric wave from the ground base station 4 in the mesh #10. The mesh #10 in which the above-described Formula (3) is established is an interference mesh.

$$SINR = P_{1,1,10}/(P_5(t) + N) \qquad (6)$$

$P_{1,1,10}$: reception power of the beam #1 from the ground base station #1, in the mesh #10

$P_5(t)$: reception power of the beam of the NTN base station 5 at time t, in the mesh #10

N: Noise power

Here, since the NTN base station 5 is constantly moving, it is preferable that the electric wave environment database DB associate the time and the reception power of the beam from NTN base station 5 with each other. This allows the control unit 11 to calculate the time when the mesh #100 becomes the interference mesh, in consideration of the movement of the NTN base station 5.

As a result of this determination, in steps S21 to S23, a mesh in which a level of interference between the ground base stations 4 is relatively small and which was not an interference mesh may become an interference mesh.

The NTN base station 5 can control the beam or change the frequency so as to avoid the interference mesh.

Figure 14:
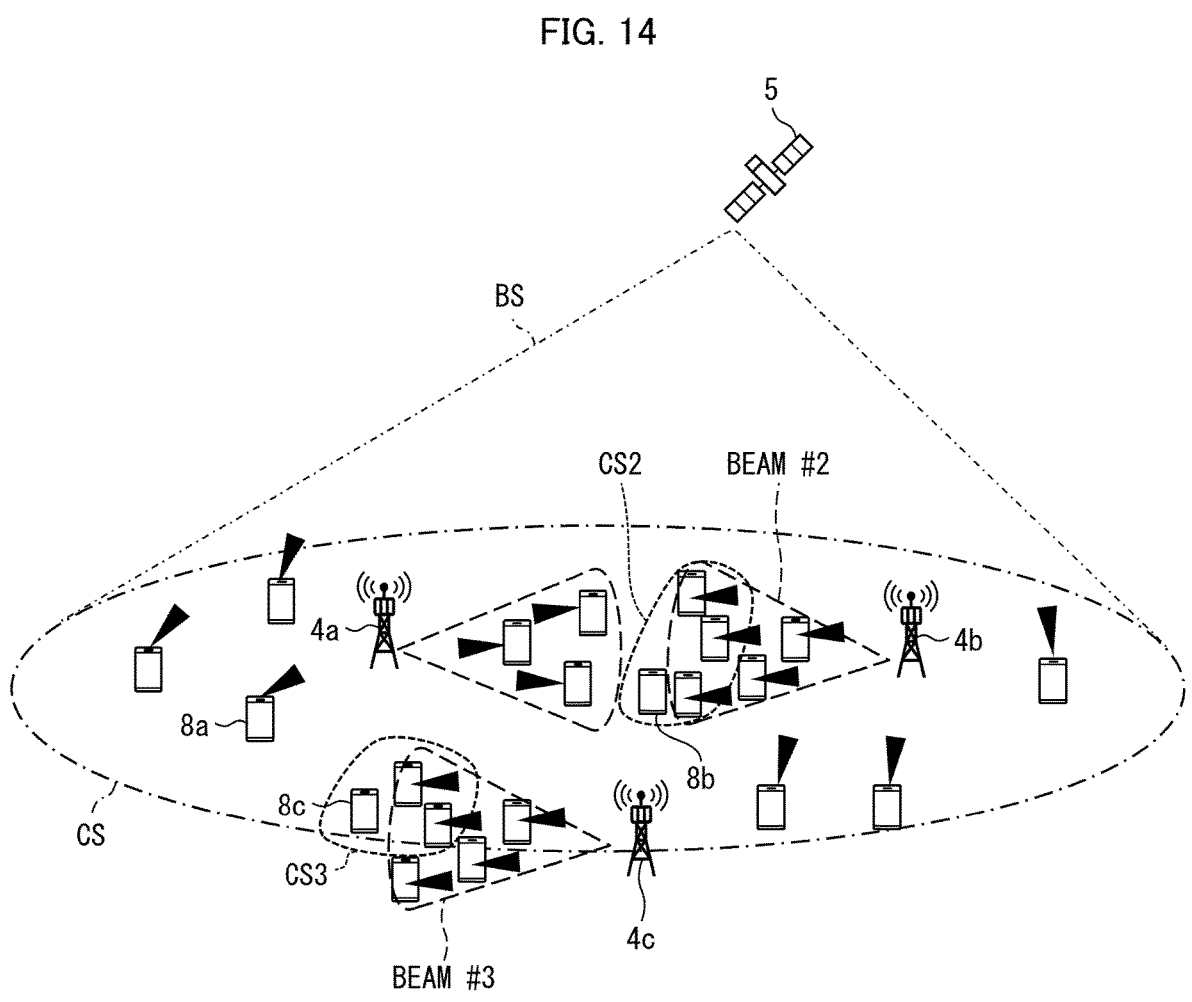
FIG. 14 is a diagram illustrating an example process for adjusting a beam of the electric wave from an NTN base station according to the second example embodiment of the present invention.

For example, as illustrated in FIG. 14, the communication terminal 8a can receive a beam of an electric wave from the NTN base station 5 in a state in which the level of interference from the ground base station 4 is small. On the other hand, the communication terminals 8b and 8c may receive the beams #2 and #3 of the electric waves from the ground base stations 4b and 4c in a state in which the level of interference caused by the beam BS of the electric waves from the NTN base station 5 is large.

In such a case, the beam of the electric wave from the NTN base station 5 is adjusted and areas CS2 and CS3 where the beam of the electric wave from the NTN base station 5 is not received are formed in an original cell CS of the NTN base station 5 (see FIG. 14). As a result, in the communication terminals 8b and 8c, it is possible to reduce the level at which the electric wave from the NTN base station 5 interferes with the electric waves from the ground base stations 4b and 4c. Note that, in a case where the antenna 53 of the NTN base station 5 has a plurality of antenna elements, such adjustment of the beam of the electric wave becomes easy.

E. Change the directivity direction of an antenna 83 at a communication terminal 8 where electric waves of the ground base station 4 and the NTN base station 5 interfere with each other (step S25).

The control unit 11 determines the directivity direction of each of the antennas 83 of the communication terminals 8 located in the predetermined area such that in a case where the level at which the beam of the electric wave from the NTN base station 5 interferes with a communication terminal located in the predetermined area is not less than a predetermined level, the directivity direction is set to a direction toward the ground base station so as to avert the NTN base station 5 or alternatively to the direction toward the NTN base station 5. Further, the control unit 11 determines the directivity direction of each of the antennas 83 of the communication terminals 8 so as to avert the NTN base station 5 at the time when the level at which the beam of the electric wave from the NTN base station 5 becomes not less than a predetermined level.

At this time, the control unit 11 determines the directivity direction of each of the antennas 83 of the communication terminals 8 so that interference is unlikely to occur due to the NTN base station 5 or another ground base station 4, and so that the antennas 83 face the ground base station 4 or the NTN base station 5 so as to increase the communication efficiency. That is, the control unit 11 can select, as appropriate, the directivity direction of each of the antennas 83 from the group consisting of the directions toward the ground base stations 4 and the direction toward the NTN base station 5.

For a communication terminal 8 in a mesh in which the level of interference between the electric wave from the ground base station 4 and the electric wave from the NTN base station is not less than a predetermined level even after the directivity direction of an antenna 83 of the communication terminal 8 has been changed, the frequency for communication may be changed.

F. Control the communication terminals 8 and the base stations (step S26)

The communication control apparatus 1 notifies the base stations and the communication terminals 8 of instruction information. The instruction information is information that instructs, on the basis of the above determination, to change the directivity direction of each of the antennas 83 of the communication terminals 8, the frequency of each of the electric waves from the antennas 83, and the beam direction and the frequency of each of the electric waves of the base stations. The communication terminals 8 and the base stations change the directivity direction, the beam direction, and the frequency of the antennas 83 on the basis of this instruction information.

A communication terminal 8 that is connected to a base station and that has established communication can receive the instruction information via the base station. A communication terminal 8 that is not connected to any base station can receive the instruction information while the direction of an antenna 83 is being changed (beam scanning). Since the instruction information has a small amount of information, the instruction information can be transmitted and received even before communication with the base station is established. Further, in a case where the antenna 83 of the communication terminal 8 has a non-directional antenna element, the instruction information may be received by using this antenna element.

As described above, in the second example embodiment, the communication control apparatus 1 determines the directivity direction of each of the antennas 83 of the plurality of communication terminals 8, on the basis of the terminal location prediction information and the electric wave environment database. In response to this determination, the communication terminal 8 changes the directivity direction of each of the antennas 83 and communicates with the base station. This makes it possible to efficiently use the plurality of base stations.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

The whole or part of the example embodiments disclosed above can also be described as below. Note, however, that the present invention is not limited to the following example aspects.

(Supplementary Note 1)

A communication apparatus (1) according to supplementary note 1 is a communication control apparatus which controls communication between a plurality of communication terminals (8) each located in any one of a plurality of areas (meshes) and a plurality of base station (4, 5), the communication control apparatus including a control unit, the control unit determining a directivity direction of each of antennas of the plurality of communication terminals, on the basis of: terminal location prediction information in which locations of the plurality of communication terminals are predicted; and an electric wave environment database in which the plurality of base stations, beam directions of respective electric waves from the base stations, the plurality of areas, and reception powers of the respective electric waves in the plurality of areas are associated with each other. This makes it possible to determine directivity directions of antennas of a plurality of communication terminals on the basis of terminal location prediction information and electric wave environment database, so that a plurality of base stations can be efficiently used.

(Supplementary Note 2)

The communication control apparatus (1) according to supplementary note 2 is such that in the communication control apparatus according to supplementary note 1: in a case where on the basis of the electric wave environment database, the directivity direction (BT) of each of antennas (83) of one or more communication terminals (8), among the plurality of communication terminals, in a predetermined area (mesh) is set to not a direction toward a first base station, which transmits a beam of a first electric wave having a first reception strength in the predetermined area, but a direction toward a second base station, which transmits a beam of a second electric wave having a second reception strength lower than the first reception strength in the predetermined area, the control unit calculates a level of interference of the first electric wave to the second electric wave; and in a case where the level of the interference is not more than a predetermined level, the control unit calculates, on the basis of the terminal location prediction information, (a) a first communication efficiency in a case where the directivity direction of each of the antennas of the communication terminals located in the predetermined area is set to the direction toward the first base station and (b) a second communication efficiency in a case where the directivity direction of each of the antennas of the communication terminals located in the predetermined area is set to the direction toward the second base station, and the control unit determines, on the basis of the first and second communication efficiencies, the directivity direction of each of the antennas of the communication terminals located in the predetermined area. This makes it possible to efficiently use a second base station that transmits an electric wave having a smaller reception strength than a first base station.

(Supplementary Note 3)

The communication control apparatus (1) according to supplementary note 3 is such that in the communication control apparatus according to supplementary note 2, the beam of the first electric wave has a largest reception power in the predetermined area, and the beam of the second electric wave has a second largest reception power in the predetermined area. This makes it possible to efficiently use a second base station that transmits an electric wave having a second highest reception strength next to a base station that transmits an electric wave having the highest reception strength.

(Supplementary Note 4)

The communication control apparatus (1) according to supplementary note 4 is such that in the communication control apparatus according to supplementary note 2: the control unit calculates (a) the first number of one or more communication terminals that are located in the predetermined area and that are capable of communicating with the first terminal station in a case where the directivity direction of each of the antennas of the communication terminals in the predetermined area is set to the direction toward the first base station and (b) the second number of communication terminals that are located in the predetermined area and that are capable of communicating with the second terminal station in a case where the directivity direction of each of the antennas of the communication terminals in the predetermined area is set to the direction toward the second base station; and the control unit calculates the first communication efficiency on the basis of the first number of the one or more communication terminals and the second communication efficiency on the basis of the second number of the one or more communication terminals. Since the communication efficiency is calculated on the basis of the number of communication terminals with which each base station communicates, it is possible to efficiently use the base stations and increase communication efficiency.

(Supplementary Note 5)

The communication control apparatus (1) according to supplementary note 5 is such that in the communication control apparatus according to supplementary note 1: the control unit identifies an area where a level of interference caused by the respective electric waves transmitted by the plurality of base stations is not less than a predetermined level, on the basis of the terminal location prediction information and the electric wave environment database; the control unit identifies, in the area thus identified, a base station that has a largest effect on the level of interference; the control unit determines a direction of a beam of an electric wave from the base station thus identified; and the control unit determines the directivity direction of an antenna of a communication terminal located in the area identified such that the directivity direction corresponds to the direction of the electric wave determined. Since the beam direction of a base station that has a largest effect on interference is changed, it is possible to efficiently use the base stations.

(Supplementary Note 6)

The communication control apparatus (1) according to supplementary note 6 is such that in the communication control apparatus according to supplementary note 1, the plurality of base stations include a ground base station and a non-terrestrial network base station; and the control unit calculates, on the electric wave environment database, a level of interference in a communication terminal located in a predetermined area, the interference being caused by a beam of an electric wave from the non-terrestrial network base station, and in a case where the level of the interference is not less than a predetermined level, the control unit determines the directivity direction of an antenna of the communication terminal located in the predetermined area so that the directivity direction is set to a direction toward the ground base station so as to avert the non-terrestrial network base station or set to a direction toward the non-terrestrial network base station. This makes it possible to efficiently use both of the ground base station and the non-terrestrial network base station.

(Supplementary Note 7)

A communication terminal (8) according to supplementary note 7 changes a directivity direction of an antenna on the basis of a directivity direction of the antenna which has been determined by the communication control apparatus according to any one of supplementary notes 1 to 6. In this configuration, the communication terminal changes the directivity direction of each of the antennas, on the basis of a directivity direction of each of the antennas which has been determined by the communication control apparatus. This makes it possible to efficiently use the base station.

(Supplementary Note 8)

A communication system (100) according to supplementary note 8 includes a communication control apparatus according to any one of supplementary notes 1 to 6, and a communication terminal according to supplementary note 7.

(Supplementary Note 9)

A communication control method (S1) according to supplementary note 9 is a communication control method for controlling communication between a plurality of communication terminals each located in any one of a plurality of areas and a plurality of base station, the method including the step of determining a directivity direction of each of antennas of the plurality of communication terminals, on the basis of: terminal location prediction information in which locations of the plurality of communication terminals are predicted; and an electric wave environment database in which the plurality of base stations, beam directions of respective electric waves transmitted from the base stations, the plurality of areas, and reception powers of the respective electric waves in the plurality of areas are associated with each other. This makes it possible to provide a communication control method that can make it possible to efficiently use base stations.

(Supplementary Note 10)

A program according to supplementary note 10 for causing a computer to function as a communication control device, the program causing the computer to determine a directivity direction of each of antennas of the plurality of communication terminals, on the basis of: terminal location prediction information in which locations of the plurality of communication terminals are predicted; and an electric wave environment database in which the plurality of base stations, beam directions of respective electric waves transmitted from the base stations, the plurality of areas, and reception powers of the respective electric waves in the plurality of areas are associated with each other. This makes it possible to cause a computer to function as a communication control apparatus capable of efficiently using base stations.

REFERENCE SIGNS LIST

100 communication system
1 communication control apparatus
4 ground base station
5 non-terrestrial network (NTN) base station
8 communication terminal
11, 41, 51, 81 control unit
12 storage unit
13, 42, 52, 82 communication unit
43, 53, 83 antenna

The invention claimed is:

1. A communication control apparatus which controls communication between a plurality of communication terminals each located in any one of a plurality of areas and a plurality of base station, the communication control apparatus comprising at least one processor, the at least one processor carrying out a control process in which a directivity direction of each of antennas of the plurality of communication terminals is determined, on the basis of:

terminal location prediction information in which locations of the plurality of communication terminals are predicted; and an electric wave environment database in which the plurality of base stations, beam directions of respective electric waves from the base stations, the plurality of areas, and reception powers of the respective electric waves in the plurality of areas are associated with each other, wherein, in the control process:

in a case where on the basis of the electric wave environment database, the directivity direction of each of antennas of one or more communication terminals, among the plurality of communication terminals, in a predetermined area is set to not a direction toward a first base station, which transmits a beam of a first electric wave having a first reception strength in the predetermined area, but a direction toward a second base station, which transmits a beam of a second electric wave having a second reception strength lower than the first reception strength in the predetermined area, the at least one processor calculates a level of interference of the first electric wave to the second electric wave; and in a case where the level of the interference is not more than a predetermined level, the at least one processor calculates, on the basis of the terminal location prediction information, (a) a first communication efficiency in a case where the directivity direction of each of the antennas of the communication terminals located in the predetermined area is set to the direction toward the first base station and (b) a second communication efficiency in a case where the directivity direction of each of the antennas of the communication terminals located in the predetermined area is set to the direction toward the second base station, and the at least one processor determines, on the basis of the first and second communication efficiencies, the directivity direction of each of the antennas of the communication terminals located in the predetermined area.

2. The communication control apparatus according to claim 1, wherein the beam of the first electric wave has a largest reception power in the predetermined area, and the beam of the second electric wave has a second largest reception power in the predetermined area.

3. The communication control apparatus according to claim 1, wherein, in the control process:

the at least one processor calculates (a) the first number of the one or more communication terminals that are located in the predetermined area and that are capable of communicating with the first terminal station in a case where the directivity direction of each of the antennas of the communication terminals in the predetermined area is set to the direction toward the first base station and (b) the second number of communication terminals that are located in the predetermined area and that are capable of communicating with the second terminal station in a case where the directivity direction of each of the antennas of the communication terminals in the predetermined area is set to the direction toward the second base station; and the at least one processor calculates the first communication efficiency on the basis of the first number of the one or more communication terminals and the second communication efficiency on the basis of the second number of the one or more communication terminals.

4. The communication control apparatus according to claim 1, wherein, in the control process:

the at least one processor identifies an area where a level of interference caused by the respective electric waves transmitted by the plurality of base stations is not less than a predetermined level, on the basis of the terminal location prediction information and the electric wave environment database;

the at least one processor identifies, in the area thus identified, a base station that has a largest effect on the level of interference;

the at least one processor determines a direction of a beam of an electric wave from the base station thus identified; and the at least one processor determines the directivity direction of an antenna of a communication terminal located in the area identified such that the directivity direction corresponds to the direction of the electric wave determined.

5. The communication control apparatus according to claim 1, wherein:

the plurality of base stations include a ground base station and a non-terrestrial network base station; and in the control process, the at least one processor calculates, on the electric wave environment database, a level of interference in a communication terminal located in a predetermined area, the interference being caused by a beam of an electric wave from the non-terrestrial network base station, and in a case where the level of the interference is not less than a predetermined level, the at least one processor determines the directivity direction of an antenna of the communication terminal located in the predetermined area so that the directivity direction is set to a direction toward the ground base station so as to avert the non-terrestrial network base station or set to a direction toward the non-terrestrial network base station.

6. A communication terminal that changes a directivity direction of an antenna on the basis of a directivity direction of the antenna which has been determined by the communication control apparatus according to claim 1.

7. A communication system comprising a communication control apparatus according to claim 1, and a communication terminal that changes a directivity direction of an antenna on the basis of a directivity direction of the antenna which has been determined by the communication control apparatus.

8. A communication control method which is carried out by a communication control apparatus for controlling communication between a plurality of communication terminals each located in any one of a plurality of areas and a plurality of base station, the communication control apparatus including at least one processor, the at least one processor carrying out a control process in which a directivity direction of each of antennas of the plurality of communication terminals is determined, on the basis of:

terminal location prediction information in which locations of the plurality of communication terminals are predicted; and an electric wave environment database in which the plurality of base stations, beam directions of respective electric waves transmitted from the base stations, the plurality of areas, and reception powers of the respective electric waves in the plurality of areas are associated with each other, wherein, in the control process:

in a case where on the basis of the electric wave environment database, the directivity direction of each of antennas of one or more communication terminals, among the plurality of communication terminals, in a predetermined area is set to not a direction toward a first base station, which transmits a beam of a first electric wave having a first reception strength in the predetermined area, but a direction toward a second base station, which transmits a beam of a second electric wave having a second reception strength lower than the first reception strength in the predetermined area, the at least one processor calculates a level of interference of the first electric wave to the second electric wave; and in a case where the level of the interference is not more than a predetermined level, the at least one processor calculates, on the basis of the terminal location prediction information, (a) a first communication efficiency in a case where the directivity direction of each of the antennas of the communication terminals located in the predetermined area is set to the direction toward the first base station and (b) a second communication efficiency in a case where the directivity direction of each of the antennas of the communication terminals located in the predetermined area is set to the direction toward the second base station, and the at least one processor determines, on the basis of the first and second communication efficiencies, the directivity direction of each of the antennas of the communication terminals located in the predetermined area.

9. The communication control method according to claim 8, wherein the beam of the first electric wave has a largest reception power in the predetermined area, and the beam of the second electric wave has a second largest reception power in the predetermined area.

10. The communication control method according to claim 8, wherein, in the control process:

the at least one processor calculates (a) the first number of the one or more communication terminals that are located in the predetermined area and that are capable of communicating with the first terminal station in a case where the directivity direction of each of the antennas of the communication terminals in the predetermined area is set to the direction toward the first base station and (b) the second number of communication terminals that are located in the predetermined area and that are capable of communicating with the second terminal station in a case where the directivity direction of each of the antennas of the communication terminals in the predetermined area is set to the direction toward the second base station; and the at least one processor calculates the first communication efficiency on the basis of the first number of the one or more communication terminals and the second communication efficiency on the basis of the second number of the one or more communication terminals.

11. The communication control method according to claim 8, wherein, in the control process:

the at least one processor identifies an area where a level of interference caused by the respective electric waves transmitted by the plurality of base stations is not less than a predetermined level, on the basis of the terminal location prediction information and the electric wave environment database;

the at least one processor identifies, in the area thus identified, a base station that has a largest effect on the level of interference;

the at least one processor determines a direction of a beam of an electric wave from the base station thus identified; and the at least one processor determines the directivity direction of an antenna of a communication terminal located in the area identified such that the directivity direction corresponds to the direction of the electric wave determined.

12. The communication control method according to claim 8, wherein:

the plurality of base stations include a ground base station and a non-terrestrial network base station; and in the control process, the at least one processor calculates, on the electric wave environment database, a level of interference in a communication terminal located in a predetermined area, the interference being caused by a beam of an electric wave from the non-terrestrial network base station; and in a case where the level of the interference is not less than a predetermined level, the at least one processor determines the directivity direction of an antenna of the communication terminal located in the predetermined area so that the directivity direction is set to a direction toward the ground base station so as to avert the non-terrestrial network base station or set to a direction toward the non-terrestrial network base station.

13. A non-transitory computer-readable storage medium storing a program for causing one or more computers to control communication between a plurality of communication terminals each located in any one of a plurality of areas and a plurality of base station, the program causing the one or more computers to determine a directivity direction of each of antennas of the plurality of communication terminals, on the basis of:

terminal location prediction information in which locations of the plurality of communication terminals are predicted; and an electric wave environment database in which the plurality of base stations, beam directions of respective electric waves transmitted from the base stations, the plurality of areas, and reception powers of the respective electric waves in the plurality of areas are associated with each other, wherein:

in a case where on the basis of the electric wave environment database, the directivity direction of each of antennas of one or more communication terminals, among the plurality of communication terminals, in a predetermined area is set to not a direction toward a first base station, which transmits a beam of a first electric wave having a first reception strength in the predetermined area, but a direction toward a second base station, which transmits a beam of a second electric wave having a second reception strength lower than the first reception strength in the predetermined area, the one or more computers calculates a level of interference of the first electric wave to the second electric wave; and in a case where the level of the interference is not more than a predetermined level, the one or more computers calculates, on the basis of the terminal location prediction information, (a) a first communication efficiency in a case where the directivity direction of each of the antennas of the communication terminals located in the predetermined area is set to the direction toward the first base station and (b) a second communication efficiency in a case where the directivity direction of each of the antennas of the communication terminals located in the predetermined area is set to the direction toward the second base station, and the one or more computers determines, on the basis of the first and second communication efficiencies, the directivity direction of each of the antennas of the communication terminals located in the predetermined area.

* * * * *